(12) United States Patent
Claessen et al.

(10) Patent No.: US 11,379,975 B2
(45) Date of Patent: Jul. 5, 2022

(54) CLASSIFICATION AND 3D MODELLING OF 3D DENTO-MAXILLOFACIAL STRUCTURES USING DEEP LEARNING METHODS

(71) Applicant: Promaton Holding B.V., The Hague (NL)

(72) Inventors: Frank Theodorus Catharina Claessen, The Hague (NL); Bas Alexander Verheij, The Hague (NL); David Anssari Moin, The Hague (NL)

(73) Assignee: PROMATON HOLDING B.V., Amsterdam (NL)

(*) Notice: Subject to any disclaimer, the term of this patent is extended or adjusted under 35 U.S.C. 154(b) by 0 days.

(21) Appl. No.: 16/627,173

(22) PCT Filed: Jul. 2, 2018

(86) PCT No.: PCT/EP2018/067850
§ 371 (c)(1),
(2) Date: Dec. 27, 2019

(87) PCT Pub. No.: WO2019/002631
PCT Pub. Date: Jan. 3, 2019

(65) Prior Publication Data
US 2021/0150702 A1     May 20, 2021

(30) Foreign Application Priority Data
Jun. 30, 2017   (EP) .................................... 17179185

(51) Int. Cl.
*G06K 9/00* (2006.01)
*G06T 7/00* (2017.01)
(Continued)

(52) U.S. Cl.
CPC ............. *G06T 7/0012* (2013.01); *G06N 3/08* (2013.01); *G06T 17/10* (2013.01);
(Continued)

(58) Field of Classification Search
None
See application file for complete search history.

(56) References Cited

U.S. PATENT DOCUMENTS

| 6,721,387 B1 | 4/2004 | Naidu et al. |
| 8,135,569 B2 | 3/2012 | Matov et al. |

(Continued)

FOREIGN PATENT DOCUMENTS

| CN | 101977564 A | 2/2011 |
| CN | 106618760 A | 5/2017 |

(Continued)

OTHER PUBLICATIONS

Ahn, B. "The Compact 3D Convolutional Neural Network for Medical Images", Jul. 2, 2017, pp. 1-9, http://cs231n.standord.edu/reports/2017/pdfs/23/pdf, retrieved Dec. 18, 2018.

(Continued)

*Primary Examiner* — Atiba O Fitzpatrick
(74) *Attorney, Agent, or Firm* — Steven M. Koehler; Westman, Champlin & Koehler, P.A.

(57) ABSTRACT

A computer-implemented method for processing 3D image data of a dento-maxillofacial structure is described wherein the method may comprise the steps of: receiving 3D image data defining a volume of voxels, a voxel being associated with a radiodensity value and a position in the volume and the voxels providing a 3D representation of a dento-maxillofacial structure; using the voxels of the 3D image data to determine one or more 3D positional features for input to a first deep neural network, a 3D positional feature defining information aggregated from the entire received 3D data set; and, the first deep neural network receiving the 3D image data and the one or more positional features at its input and (Continued)

using the one or more 3D positional features to classify at least part of the voxels of the 3D image data into jaw, teeth and/or nerve voxels.

15 Claims, 12 Drawing Sheets

(51) Int. Cl.
  *G06N 3/08* (2006.01)
  *G06T 17/10* (2006.01)

(52) U.S. Cl.
  CPC .............. *G06T 2207/10081* (2013.01); *G06T 2207/20081* (2013.01); *G06T 2207/20084* (2013.01); *G06T 2207/30036* (2013.01)

(56) References Cited

U.S. PATENT DOCUMENTS

| | | | |
|---|---|---|---|
| 8,439,672 | B2 | 5/2013 | Matov et al. |
| 8,639,477 | B2 | 1/2014 | Chelnokov et al. |
| 9,107,722 | B2 | 8/2015 | Matov et al. |
| 9,135,498 | B2 | 9/2015 | Andreiko et al. |
| 9,904,999 | B2 | 2/2018 | Andreiko et al. |
| 10,032,271 | B2 | 7/2018 | Somasundaram et al. |
| 10,235,606 | B2 | 3/2019 | Miao et al. |
| 10,456,229 | B2 | 10/2019 | Fisker et al. |
| 10,610,185 | B2 | 4/2020 | Taguchi et al. |
| 10,685,259 | B2 | 6/2020 | Salah et al. |
| 10,932,890 | B1 | 3/2021 | Sant et al. |
| 10,997,727 | B2 | 5/2021 | Xue et al. |
| 11,007,036 | B2 | 5/2021 | Pokotilov et al. |
| 11,107,218 | B2 | 8/2021 | Salah et al. |
| 2008/0253635 | A1 | 10/2008 | Spies et al. |
| 2009/0129639 | A1* | 5/2009 | Ortega ............ A61B 6/5223 382/128 |
| 2009/0191503 | A1 | 7/2009 | Matov et al. |
| 2010/0069741 | A1 | 3/2010 | Kuhn et al. |
| 2011/0038516 | A1 | 2/2011 | Koehler et al. |
| 2011/0081071 | A1 | 4/2011 | Benson et al. |
| 2011/0255765 | A1 | 10/2011 | Carlson et al. |
| 2013/0039556 | A1 | 2/2013 | Kachelriess et al. |
| 2013/0230818 | A1 | 9/2013 | Matov et al. |
| 2014/0169648 | A1 | 6/2014 | Andreiko et al. |
| 2014/0227655 | A1 | 8/2014 | Andreiko et al. |
| 2015/0029178 | A1 | 1/2015 | Claus et al. |
| 2016/0008095 | A1 | 1/2016 | Matov et al. |
| 2016/0042509 | A1 | 2/2016 | Andreiko et al. |
| 2016/0078647 | A1 | 3/2016 | Schildkraut et al. |
| 2016/0117850 | A1 | 4/2016 | Jin et al. |
| 2016/0324499 | A1 | 11/2016 | Sen Sharma et al. |
| 2016/0371862 | A1 | 12/2016 | Silver et al. |
| 2017/0024634 | A1 | 1/2017 | Miao et al. |
| 2017/0046616 | A1 | 2/2017 | Socher et al. |
| 2017/0100212 | A1 | 4/2017 | Sherwood et al. |
| 2017/0150937 | A1 | 6/2017 | Stille et al. |
| 2017/0169562 | A1 | 6/2017 | Somasundaram et al. |
| 2017/0265977 | A1 | 9/2017 | Fisker et al. |
| 2017/0270687 | A1 | 9/2017 | Manhart |
| 2018/0028294 | A1* | 2/2018 | Azernikov ........... G06K 9/6274 |
| 2018/0089530 | A1* | 3/2018 | Liu ................. G06K 9/4628 |
| 2018/0110590 | A1 | 4/2018 | Maraj et al. |
| 2018/0182098 | A1 | 6/2018 | Andreiko et al. |
| 2018/0300877 | A1 | 10/2018 | Somasundaram et al. |
| 2019/0026599 | A1 | 1/2019 | Salah et al. |
| 2019/0147666 | A1* | 5/2019 | Keustermans ....... A61C 8/0001 433/213 |
| 2019/0164288 | A1 | 5/2019 | Wang et al. |
| 2019/0172200 | A1 | 6/2019 | Andreiko et al. |
| 2019/0282333 | A1 | 9/2019 | Matov et al. |
| 2019/0328489 | A1 | 10/2019 | Capron-Richard et al. |
| 2020/0015948 | A1 | 1/2020 | Fisker et al. |
| 2020/0022790 | A1 | 1/2020 | Fisker |
| 2020/0085535 | A1 | 3/2020 | Pokotilov et al. |
| 2020/0179089 | A1* | 6/2020 | Serval ................. A61C 17/221 |
| 2020/0320685 | A1 | 10/2020 | Moin et al. |
| 2021/0045843 | A1 | 2/2021 | Pokotilov et al. |
| 2021/0082184 | A1 | 3/2021 | Claessen et al. |
| 2021/0110584 | A1 | 4/2021 | Claessen et al. |
| 2021/0174543 | A1 | 6/2021 | Claessen et al. |
| 2021/0217233 | A1 | 7/2021 | Feng et al. |
| 2021/0264611 | A1 | 8/2021 | Xue et al. |
| 2021/0322136 | A1 | 10/2021 | Anssari Moin et al. |

FOREIGN PATENT DOCUMENTS

| | | |
|---|---|---|
| CN | 108205806 A | 6/2018 |
| CN | 108305684 A | 7/2018 |
| EP | 2742857 A1 | 6/2014 |
| EP | 3121789 A1 | 1/2017 |
| EP | 3462373 A1 | 4/2019 |
| EP | 3591616 A1 | 1/2020 |
| EP | 3671531 A1 | 6/2020 |
| EP | 3767521 A1 | 1/2021 |
| WO | 2015169910 A1 | 11/2015 |
| WO | 2017099990 A1 | 6/2017 |
| WO | 2019002631 A1 | 1/2019 |
| WO | 2019068741 A2 | 4/2019 |
| WO | 2020007941 A1 | 1/2020 |
| WO | 2020127398 A1 | 6/2020 |
| WO | 2021009258 A1 | 1/2021 |

OTHER PUBLICATIONS

Auro Tripathy, "Five Insights from GoogLeNet You Could Use In Your Own Deep Learning Nets", Sep. 20, 2016, pp. 1-21, https://www.slideshare.net/aurot/googlenet-insights?from_action=save, retrieved Dec. 18, 2018.

Bustos et al. "An Experimental Comparison of Feature-Based 3D Retrieval Methods" 2nd International Symposium on 3D Data Processing, Visualization, and Transmission, 3DPVT 2004, Sep. 6-9, 2004, pp. 215-222.

Chaouch, M. and Verroust-Blondet, A. "Alignment of 3D Models", Graphical Models, Mar. 2009, pp. 63-76, vol. 71, No. 2.

çiçek et al. "3D U-Net: Learning Dense Volumetric Segmentation from Sparse Annotation", Medical Image Computing and Computer-Assisted Intervention—MICCAI 2016, Part II, Oct. 2, 2016, pp. 424-432.

Duda et al. "Pattern Classification: Introduction", 2001, Pattern Classification, New York, John Wiley & Sons, US, pp. 1-13.

Duy et al. "Automatic Detection and Classification of Teeth in CT Data", International Conference on Medical Image Computing and Computer-Assisted Intervention—MICCAI 2012, 2012, pp. 609-616.

Everingham et al. "The PASCAL Visual Object Classes (VOC) Challenge", International Journal of Computer Vision, Sep. 9, 2009, pp. 303-338, vol. 88, No. 2.

Fechter et al. "A 3D Fully Convolutional Neural Network and a Random Walker to Segment the Esophagus in CT", Apr. 21, 2017, 23 pages, https://arxiv.org/pdf/1704.06544.pdf, retrieved Dec. 18, 2018.

Gjesteby et al. "Deep Learning Methods for CT Image-Domain Metal Artifact Reduction", SPIE, Developments in X-Ray Tomography XI, Sep. 25, 2017, 6 pages, vol. 10391.

Gkantidis et al. "Evaluation of 3-Dimensional Superimposition Techniques on Various Skeletal Structures of the Head Using Surface Models", PLOS One, Feb. 23, 2015, 20 pages, vol. 10, No. 2.

Hall, P. and Owen, M. "Simple Canonical Views", Proceedings of the British Machine Vision Conference (BMVC), Sep. 2005, 10 pages.

Han et al. "Deep Residual Learning for Compressed Sensing CT Reconstruction Via Persistent Homology Analysis", Cornell University Library, Nov. 19, 2016, pp. 1-10.

He et al. "Deep Residual Learning for Image Recognition", 2016 IEEE Conference on Computer Vision and Pattern Recognition (CPR), Jun. 2016, pp. 770-778.

(56) References Cited

OTHER PUBLICATIONS

Hongming Li, Y. "Non-Rigid Image Registration Using Fully Convolutional Networks With Deep Self-Supervision", Sep. 3, 2017, 8 pages.
Isola et al. "Image-to-Image Translation with Conditional Adversarial Networks", 2017 IEEE Conference on Computer Vision and Pattern Recognition (CVPR), Honolulu, HI, 2017, pp. 5967-5976.
Joda, T. and Gallucci, G. "Systematic Literature Review of Digital Three-Dimensional Superimposition Techniques to Create Virtual Dental Patients", The International Journal of Oral & Maxillofacial Implants, 2015, pp. 330-337, vol. 30, No. 2.
Jung et al. "Combining Volumetric Dental CT and Optical Scan Data for Teeth Modeling", Computer-Aided Design, Oct. 2015, pp. 24-37, vol. 67-68.
Klinder et al. "Automated Model-Based Vertebra Detection, Identification, and Segmentation in CT Images", Medical Image Analysis, Jun. 2009, pp. 471-482, vol. 13, No. 3.
Li et al. "PointCNN: Convolution On X-Transformed Points", Neural Information Processing Systems (NIPS), Nov. 5, 2018, 11 pages.
Liao et al. "Automatic Tooth Segmentation of Dental Mesh Based on Harmonic Fields", Biomedical Research International, 2015, 10 pages, vol. 2015.
Litjens et al. "A Survey on Deep Learning in Medical Image Analysis", Medical Image Analysis, Dec. 2017, pp. 60-88, vol. 42.
Meyer et al. "Normalized Metal Artifact Reduction (NMAR) in Computed Tomography", Medical Physics, Oct. 2010, pp. 5482-5493, vol. 37, No. 10.
Miki et al. "Tooth Labeling in Cone-Beam CT Using Deep Convolutional Neural Network for Forensic Identification", SPIE 10134, Medical Imaging 2017: Computer-Aided Diagnosis, Mar. 3, 2017, 6 pages.
Miki et al. "Classification of Teeth in Cone-Beam CT Using Deep Convolutional Neural Network", Computers in Biology and Medicine, Jan. 2017, pp. 24-29, vol. 1, No. 80.
Pavaloiu et al. "Automatic Segmentation for 3D Dental Reconstruction", IEEE 6th ICCCNT, Jul. 13-15, 2015, 6 pages.
Pavaloiu et al. "Neural Network Based Edge Detection for CBCT Segmentation", 5th IEEE EHB, Nov. 19-21, 2015.
Qi et al. "PointNet: Deep Learning on Point Sets for 3D Classification and Segmentation", Computer Vision and Pattern Recognition (CVPR), 2017, 19 pages.
Ruellas et al. "3D Mandibular Superimposition: Comparison of Regions of Reference for Voxel-Based Registration" PLOS One, Jun. 23, 2016, 13 pages.
Ryu et al. "Analysis of Skin Movement With Respect to Flexional Bone Motion Using MR Images of a Hand", Journal of Biomechanics, 2006, pp. 844-852, vol. 39, No. 5.
Schulze et al. "Artefacts in CBCT: A Review", Dentomaxillofacial Radiology, Jul. 1, 2011, pp. 265-273, vol. 40, No. 5.
Sekuboyina et al. "A Localisation-Segmentation Approach for Multi-Label Annotation of Lumbar Vertebrae Using Deep Nuts", Cornell University Library, 201 Olin Library Cornell University Ithaca, NY 14853, Mar. 13, 2017, 10 pages.
Simonovsky et al. "A Deep Metric for Multimodal Registration" International Conference on Medical Image Computing and Computer-Assisted Intervention (MICCAI), 2016, pp. 10-18, vol. 9902.
Szegedy et al. "Going Deeper With Convolutions", 2015 IEEE Conference on Computer Vision and Pattern Recognition (CVPR), Jun. 2015, pp. 1-9.
Tonioni et al. "Learning to Detect Good 3D Keypoints", International Journal of Computer Vision, 2018, pp. 1-20, vol. 126.
Wang et al. "Dynamic Graph CNN for Learning on Point Clouds", ACM Trans. Graph, Jan. 2019, vol. 1, No. 1, 13 pages.
Wu et al. "Tooth Segmentation on Dental Meshes Using Morphologic Skeleton", Computers & Graphics, Feb. 2014, pp. 199-211, vol. 38.
Wu et al. "Model-Based Teeth Reconstruction", ACM Transactions on Graphics (TOG), ACM, US, Nov. 11, 2016, pp. 1-13, vol. 35, No. 6.
Yau et al. "Tooth Model Reconstruction Based Upon Data Fusion for Orthodontic Treatment Simulation", Computers in Biology and Medicine, May 1, 2014, pp. 8-16, vol. 48.
Yu, Y. "Machine Learning for Dental Image Analysis", Nov. 2016, 61 pages, https://arxiv.org/ftp/arxiv/papers/1611/1611.09958.pdf, retrieved Nov. 30, 2017.
Zhang, Y. and Yu, H. "Convolutional Neural Network Based Metal Artifact Reduction in X-Ray Computed Tomography", IEEE Transactions on Medical Imaging, Jun. 2018, pp. 1370-1381, vol. 37, No. 6.
Zhang, C. and Xing, Y. "CT Artifact Reduction Via U-Net CNN", SPIE, Medical Imaging 2018: Image Processing, Mar. 2, 2018, 6 pages, vol. 10574.
International Search Report and Written Opinion for International Patent Application No. PCT/EP2018/067850, dated Sep. 5, 2018.
Chen et al. "Deep RBFNet: Point Cloud Feature Learning Using Radial Basis Functions", Cornell University Library, Dec. 11, 2018, 11 pages.
Chen et al. "Fast Resampling of 3D Point Clouds Via Graphs", IEEE Transactions on Signal Processing, Feb. 1, 2018, pp. 666-681, vol. 66, No. 3.
Eun, H. and Kim, C. "Oriented Tooth Localization for Periapical Dental X-ray Images via Convolutional Neural Network", Asia-Pacific Signal and Information Processing Association Annual Summit and Conference (APSIPA), Dec. 3, 2016, pp. 1-7.
Fang et al. "3D Deep Shape Descriptor", 2015 IEEE Conference on Computer Vision and Pattern Recognition (CVPR), 2015, pp. 2319-2328.
Ghafoorian et al. "EL-GAN: Embedding Loss Driven Generative Adversarial Networks for Lane Detection", Computer Vision—ECCV 2018 Workshops, Jan. 23, 2019, pp. 256-272, vol. 11129.
Ghazvinian Zanjani et al. "Deep Learning Approach to Semantic Segmentation in 3D Point Cloud Intra-oral Scans of Teeth", Proceedings of the 2nd International Conference on Medical Imaging with Deep Learning, 2019, 22 pages, retrieved online from https://openreview.net/forum?id=ByxLSoblgV.
Gomes et al. "Efficient 3D Object Recognition Using Foveated Point Clouds", Computers & Graphics, May 1, 2013, pp. 496-508, vol. 37.
Gorler, O. and Akkoyun, S. "Artificial Neural Networks Can be Used as Alternative Method to Estimate Loss Tooth Root Sizes for Prediction of Dental Implants", Cumhuriyet University Faculty of Science Science Journal (CSJ), Apr. 2017, pp. 385-395, vol. 38, No. 2.
Guo et al. "3D Mesh Labeling Via Deep Convolutional Neural Networks", ACM Transactions on Graphics, Dec. 2015, pp. 1-12, vol. 35, No. 1, Article 3.
Hermosilla et al. "Monte Carlo Convolution for Learning on Non-Uniformly Shaped Point Clouds", ACM Transactions on Graphics, Nov. 2018, 12 pages, vol. 37, No. 6, Article 235.
Hou et al. "3D-SIS: 3D Semantic Instance Segmentation of RGB-D Scans", Computer Vision and Pattern Recognition (CPR), Apr. 29, 2019, 14 pages.
Huang et al. "Edge-Aware Point Set Resampling", ACM Transactions on Graphics, 2013, pp. 1-12, vol. 32, No. 1, Article 9.
Johari et al. "Detection of Vertical Root Fractures in Intact and Endodontically Treated Premolar Teeth by Designing a Probabilistic Neural Network: An ex vivo Study", Dentomaxillofacial Radiology, Feb. 2017, vol. 46, No. 2, pp. 1-9.
Ku et al. "Joint 3D Proposal Generation and Object Detection from View Aggregation", IEEE/RSJ International Conference on Intelligent Robots and Systems (IROS), Jul. 12, 2018, pp. 1-8.
Le T. and Duan Y. "PointGrid: A Deep Network for 3D Shape Understanding", Proceedings of the IEEE Conference on Computer Vision and Pattern Recognition, Jun. 18-23, 2018, pp. 9204-9214.
Li et al. "SO-Net: Self-Organizing Network for Point Cloud Analysis", Eye In-Painting with Exemplar Generative Adversarial Networks, Jun. 2018, pp. 9397-9406.
Liu, C. and Furukawa, Y. "MASC: Multi-scale Affinity with Sparse Convolution for 3D Instance Segmentation", Computer Vision and Pattern Recognition (CPR), Feb. 12, 2019, 4 pages.

(56) References Cited

OTHER PUBLICATIONS

Qi et al. "Frustum PointNets for 3D Object Detection from RGB-D Data", Computer Vision and Pattern Recognition (CPR), Apr. 13, 2018, 15 pages.
Qi et al. "PointNet++: Deep Hierarchical Feature Learning on Point Sets in a Metric Space", Conference on Neural Information Processing Systems (NIPS), Jun. 2017, 14 pages.
Ravanbakhsh et al. "Deep Learning With Sets and Point Clouds", Feb. 24, 2017, 12 pages, retrieved online from https://arxiv.org/abs/1611.04500.
Silva et al. "Automatic Segmenting Teeth in X-Ray Images: Trends, A Novel Data Set, Benchmarking and Future Perspectives", Feb. 9, 2018, 33 pages, retrieved online from https://arxiv.org/pdf/1802.03086.pdf.
Skrodzki et al. "Directional Density Measure to Intrinsically Estimate and Counteract Non-Uniformity in Point Clouds", Computer Aided Geometric Design, Aug. 2018, pp. 73-89, vol. 64.
Shaoqing et al. "Mask R-CNN", Proceedings of the IEEE International Conference on Computer Vision, 2017, pp. 2961-2969.
Tian, S. "Automatic Classification and Segmentation of Teeth on 3D Dental Model Using Hierarchical Deep Learning Networks" IEEE Journals & Magazine, Jun. 21, 2019, pp. 84817-84828.
Wang et al. "SGPN: Similarity Group Proposal Network for 3D Point Cloud Instance Segmentation", CVF Conference an Computer Vision and Pattern Recognition, Nov. 23, 2017, 13 pages.
Wu et al. "3D ShapeNets: A Deep Representation for Volumetric Shapes", 2015 IEEE Conference on Computer Vision and Pattern Recognition (CVPR), 2015, pp. 1912-1920.
Xu et al. "SpiderCNN: Deep Learning on Point Sets with Parameterized Convolutional Filters", Computer Vision—EECV, 2018, 16 pages.
Yi et al. "GSPN: Generative Shape Proposal Network for 3D Instance Segmentation in Point Cloud", Proceedings of the IEEE/CVF Conference on Computer Vision and Pattern Recognition (CVPR), 2019, 13 pages.
Zhou et al. "A Method for Tooth Model Reconstruction Based on Integration of Multimodal Images", Journal of Healthcare Engineering, Jun. 20, 2018, vol. 8, pp. 1-8.

* cited by examiner

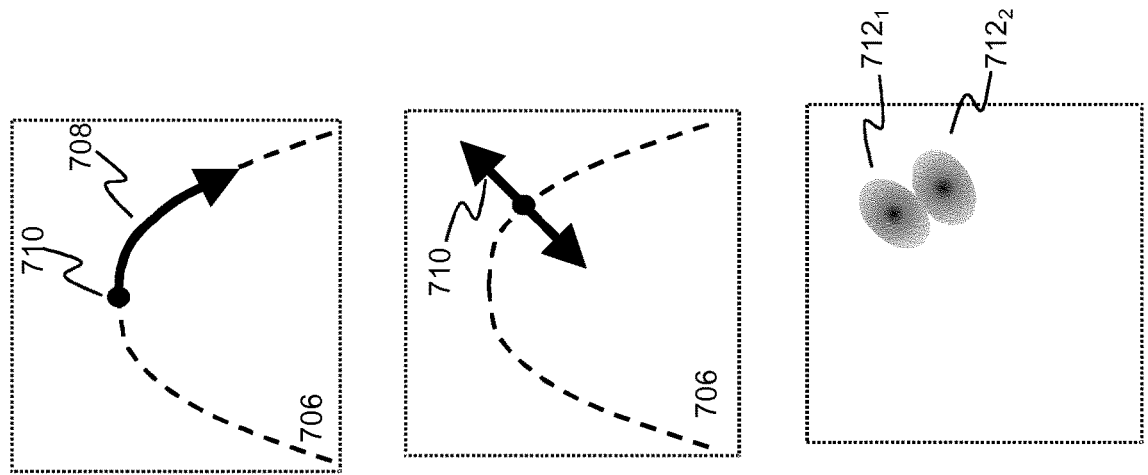
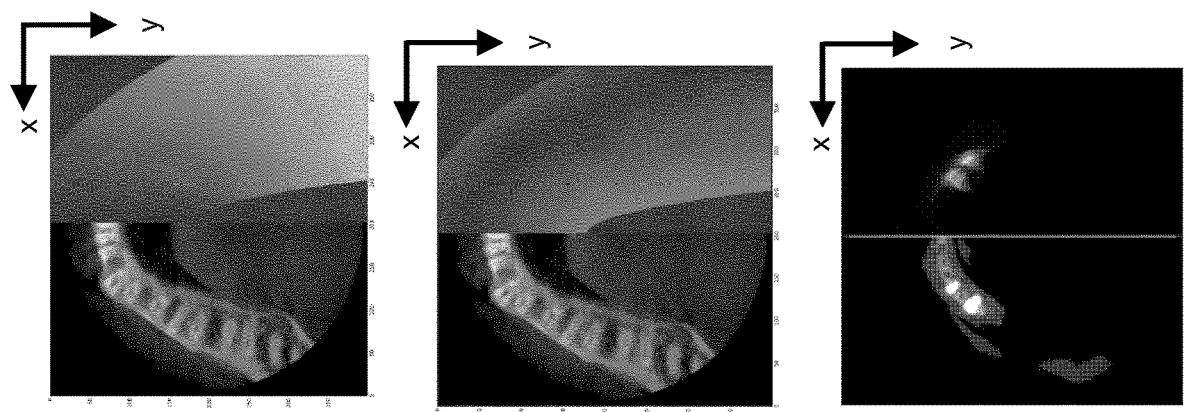
FIG. 7B    FIG. 7C    FIG. 7D

CLASSIFICATION AND 3D MODELLING OF 3D DENTO-MAXILLOFACIAL STRUCTURES USING DEEP LEARNING METHODS

CROSS REFERENCE TO RELATED APPLICATION

The present application is a national stage of and claims priority of International patent application Serial No. PCT/EP2018/067850, filed Jul. 2, 2018, and published in English as WO 2019/002631.

FIELD OF THE INVENTION

The invention relates to classification and 3D modelling of 3D dento-maxillofacial structures using deep learning neural networks, and, in particular, though not exclusively, to systems and methods for classification and 3D modelling of 3D dento-maxillofacial structures using deep learning neural networks, a method of training such deep learning neural networks, a method of pre-processing dento-maxillofacial 3D image data and a method of post-processing classified voxel data of dento-maxillofacial structures and a computer program product for using such method.

BACKGROUND OF THE INVENTION

In image analysis of dento-maxillofacial structures, visualization and 3D image reconstruction of specific parts or tissues is fundamental for enabling accurate diagnosis and treatments. Before 3D image reconstruction, a classification and segmentation process is applied to the 3D image data, e.g. voxels, to form a 3D model of different parts (e.g. teeth and jaw) of the dento-maxillofacial structure as represented in a 3D image data stack. The task of segmentation may be defined as identifying the set of pixels or voxels which make up either the contour or the interior of an object of interest. The segmentation process of dento-maxillofacial structures such as teeth, jawbone and inferior alveolar nerve from 3D CT scans is however challenging. Manual segmentation methods are extremely time-consuming and include a general approximation by manual threshold selection and manual corrections. The results of manual segmentations have low reproducibility and rely on the human interpretation of CT scans.

Different imaging methodologies have been used to generate 3D teeth and jaw models on the basis of image data of CT scans. Initially, sequential application of low-level pixel processing and mathematical modelling was used in order to segment dento-maxillofacial structures. An example is described in the article of Pavaloiu et al., "*Automatic segmentation for 3D dental reconstruction*", IEEE 6th ICCCNT, Jul. 13-15, 2015. These techniques include active contour tracking methods, watershedding, region growing and level set modelling with shape and intensity prior. Currently, in medical imaging more advanced techniques such as deep learning techniques are used for segmenting objects of interest in medical images.

These neural networks are trained to learn the features that optimally represent the data. Such deep learning algorithms includes a multilayer, deep neural network that transforms input data (e.g. images) to outputs (e.g. disease present/absent) while learning increasingly higher level features. A successful neural network model for image analysis is the so-called convolutional neural network (CNN). CNNs contain many layers that transform their input using kernels, also known as convolution filters, consisting of a relatively small sized matrix. An overview of the usage of CNNs for medical imaging can be found in the article by Litjens et al., *A Survey on Deep Learning in Medical Image Analysis*, published 21 Feb. 2017 arXiv (submitted to Computer Vision and Pattern Recognition). 3D modelling of dento-maxillofacial structures, using 3D CNNs however is difficult due to the complexity of dento-maxillofacial structures. Pavaloiu et al. described in their article "*Neural network based edge detection for CBCT segmentation*", 5th IEEE EHB, Nov. 19-21, 2015, the use of a very simple neural network in the detection of edges in the 2D CBCT images. So far however, automatic accurate 3D segmentation of 3D CBCT image data on the basis of deep learning has not been reported.

A problem in the 3D classification and 3D modelling of dento-maxillofacial structures is that dento-maxillofacial images are generated using Cone Beam Computed tomography (CBCT). CBCT is a medical imaging technique using X-ray computed tomography wherein the X-ray radiation is shaped into a divergent cone of low-dosage. The radio density, measured in Hounsfield Units (HUs), is not reliable in CBCT scans because different areas in the scan appear with different greyscale values depending on their relative positions in the organ being scanned. HUs measured from the same anatomical area with both CBCT and medical-grade CT scanners are not identical and are thus unreliable for determination of site-specific, radiographically-identified bone density.

Moreover, CBCT systems for scanning dento-maxillofacial structures do not employ a standardized system for scaling the grey levels that represent the reconstructed density values. These values are as such arbitrary and do not allow for assessment of bone quality. In the absence of such a standardization, it is difficult to interpret the grey levels or impossible to compare the values resulting from different machines. Moreover, the teeth roots and jaw bone structure have similar densities so that it is difficult for a computer to distinguish between voxels belonging to teeth and voxels belonging to a jaw. Additionally, CBCT systems are very sensitive to so-called beam hardening which produces dark streaks between two high attenuation objects (such as metal or bone), with surrounding bright streaks. The above-mentioned problems make automatic segmentation of dento-maxillofacial structures particularly challenging.

Hence, there is a need in the art for computer systems that are adapted to accurately segment 3D CT image data of dento-maxillofacial structures into a 3D model. In particular, there is a need in the art for computer systems that can accurately segment 3D CT image data of dento-maxillofacial structures originating from different CBCT systems into a 3D model.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including a functional or an object oriented programming language such as Java™, Scala, C++, Python or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer, server or virtualized server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), or graphics processing unit (GPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The present disclosure provides a system and method that implements automated classification and segmentation techniques that does not require user input or user interaction other than the input of a 3D image stack. The embodiments may be used to reproduce targeted biological tissues such as jaw bones, teeth and dento-maxillofacial nerves, such as the inferior alveolar nerve. The system automatically separates structures and constructs 3D models of the targeted tissues.

In one aspect, the invention relates to a computer-implemented method for processing 3D image data of a dento-maxillofacial structure. In an embodiment, the method may comprise: a computer receiving 3D input data, preferably 3D cone beam CT (CBCT) data, the 3D input data including a first voxel representation of the dento-maxillofacial structure, a voxel being associated with a radiation intensity value, the voxels of the voxel representation defining an image volume; a pre-processing algorithm using the 3D input data to determine one or more 3D positional features of the dento-maxillofacial structure, a 3D positional feature defining information about positions of voxels of the first voxel representation relative to the position of a dental reference plane, e.g. an axial plane positioned relative to a jaw, or the position of a dental reference object, e.g. a jaw, a dental arch and/or one or more teeth, in the image volume; the computer providing the first voxel representation and the one or more 3D positional features associated with the first voxel representation to the input of a first 3D deep neural network, preferably a 3D convolutional deep neural network, the first deep neural network being configured to classify voxels of the first voxel representation into at least jaw, teeth, and/or nerve voxels; the first neural network being trained on the basis of a training set, the training set including 3D image data of dento-maxillofacial structures and one or more 3D positional features derived from the 3D image data of the training set; the computer receiving classified voxels of the first voxel representation from the output of the first 3D deep neural network and determining a voxel representation of at least one of the jaw, teeth and/or nerve tissue of the dento-maxillofacial structure on the basis of the classified voxels.

Hence, 3D positional features define information about the position of voxels in the received image volume relative to a dental reference plane and/or a dental reference object. This information is relevant for enabling the deep neural network to automatically classify and segment a voxel presentation of a dento-maxillofacial structure. A 3D positional feature of a voxel of the first voxel representation may be formed by aggregating information (e.g. position, intensity values, distances, gradients, etc.) that is based on the whole data set or a substantial part of the voxel representation that is provided to the input of the first deep neural network. The aggregated information is processed per position of a voxel in the first voxel representation. This way, each voxel of the first voxel representation may be associated with a 3D positional feature, which the first deep neural network will take into account during the classification of the voxel.

In an embodiment, the training set may further comprise one or more 3D models of parts of the dento-maxillofacial structures of the 3D image data of the training set, In an embodiment, at least part of the one or more 3D models may be generated by optically scanning parts of the dento-maxillofacial structures of the 3D image data of the training set. In an embodiment, the one or more 3D models may be used as target during training of the first deep neural network.

The 3D positional features may be determined using (manually) engineered features and/or using (trained) machine learning methods such as a 3D deep learning network configured to derive such information from the entire received 3D data set or a substantial part thereof.

In an embodiment, a 3D positional features may define a distance, preferably a perpendicular distance, between one or more voxels in the image volume and a first dental reference plane in the image volume. In an embodiment, 3D positional features may define a distance between one or more voxels in the image volume and a first dental reference object in the image volume. In a further embodiment, the position information may include accumulated intensity values in a reference plane of the image volume, wherein an accumulated intensity value at a point in the reference plane includes accumulated intensity values of voxels on or in the proximity of the normal running through the point in the reference plane.

The 3D positional features that are extracted from the 3D image data encode information with respect to the image volume of the voxels that are provided to the input of the neural network. In particular, the 3D positional features provide information that is partly or fully derived with reference to the position of each voxel within the (subsection of) the 3D image data and will be evaluated by the deep neural network. The 3D positional features provide the neural network the means to make use of information (partly) determined by positions of voxels within the image volume to determine the likelihood that in a certain volume voxels can be found that are associated with certain dento-maxillofacial structures. Without this information, no larger spatial context might be available to be used by the deep neural network. The 3D positional features substantially improve the accuracy of the network while at the same time being designed to minimize the risk of overfitting. The 3D positional features allow the network to gain knowledge about positions of voxels in the image volume, relative to reference objects relevant for the dento-maxillofacial context, thus making this information available to determine the likelihood of finding voxels associated with tissue of a dento-maxillofacial structure. Thereby the network is enabled to learn how to best to make use of this provided information where it is relevant.

In an embodiment, the first dental reference plane may include an axial plane in the image volume positioned at predetermined distance from the upper and/or lower jaw as represented by the 3D image data. Hence, the reference plane is positioned with respect to relevant parts of dento-maxillofacial structures in the 3D image data. In an embodiment, the first dental reference plane may have an approximately equal distance to the upper and low jaw.

In an embodiment, the dental reference object may include a dental arch curve approximating at least part of a dental arch as represented by the 3D image data. Hence, in this embodiment, a 3D positional feature may provide information regarding the position of voxels in the image volume relative to the position of a dental reference object dental arch in the image volume. In an embodiment, the dental arch curve may be determined in an axial plane of the image volume.

Manually designed 3D positional features may be supplemented or replaced by other 3D positional features as may e.g. be derived from machine learning methods aggregating information from the entire or a substantial part of the 3D input data. Such feature generation may for instance be performed by a 3D deep neural network performing a pre-segmentation on a down-sampled version of the entire or a substantial part of the first voxel representation.

Hence, in an embodiment, the pre-processing algorithm may include a second 3D deep neural network, the second deep neural network being trained to receive a second voxel representation at its input, and, to determine for each voxel of the second voxel representation a 3D positional feature. In an embodiment, the 3D positional feature may include a measure indicating a likelihood that a voxel represents jaw, teeth and/or nerve tissue, wherein the second voxel representation is a low-resolution version of the first voxel representation.

In an embodiment, the second 3D deep neural network may have a 3D U-net architecture. In an embodiment, the 3D U-net may comprise a plurality of 3D neural network layers, including convolutional layers (3D CNNs), 3D max-pooling layers, 3D deconvolutional layers (3D de-CNNs), and densely connected layers.

In an embodiment, the resolution of the second voxel representation may be at least three times lower than the resolution of the first voxel presentation.

In an embodiment, the second 3D deep neural network may be trained based on the 3D image data of dento-maxillofacial structures of the training set that is used for training the first deep neural network. In an embodiment, the second 3D deep neural network based on one or more 3D models of parts of the dento-maxillofacial structures of the 3D image data of the training set that is used for training the first deep neural network. During training, these one or more 3D models may be used as a target.

In an embodiment, providing the first voxel representation and the one or more 3D positional features associated with the first voxel representation to the input of a first 3D deep neural network may further comprise: associating each voxel of the first voxel representation with at least information defined by one 3D positional feature; dividing the first voxel representation in first blocks of voxels; providing a first block of voxels to the input of the first deep neural network wherein each voxel of the first block of voxels is associated with a radiation intensity value and at least information defined by one 3D positional feature. Hence, the first 3D deep neural network may process the 3D input data on the basis of blocks of voxels. To that end, the computer may partition the first voxel representation in a plurality of first bocks of voxels and provide each of the first blocks to the input of the first 3D deep neural network.

In an embodiment, the first deep neural network may comprise a plurality of first 3D convolutional layers, wherein the output of the plurality of first 3D convolutional layers may be connected to at least one fully connected layer. In an embodiment, the plurality of first 3D convolutional layers may be configured to process a first block of voxels from the first voxel representation and wherein the at least one fully connected layer is configured to classify voxels of the first block of voxels into at least one of jaw, teeth and/or nerve voxels.

In an embodiment, a voxel provided to the input of the first deep neural network may comprise a radiation intensity value and at least one 3D positional feature.

In an embodiment, the first deep neural network may further comprise a plurality of second 3D convolutional layers, wherein the output of the plurality of second 3D convolutional layers may be connected to the at least one fully connected layer.

In an embodiment, the plurality of second 3D convolutional layers may be configured to process a second block of voxels from the first voxel representation, wherein the first and second block of voxels may have the same or substantially the same center point in the image volume and wherein second block of voxels may represent a volume in real-world dimensions that is larger than the volume in real-world dimensions of the first block of voxels.

In an embodiment, the plurality of second 3D convolutional layers may be configured to determine contextual information associated with voxels of the first block of voxels that is provided to the input of the plurality of first 3D convolutional layers.

In an embodiment, the first deep neural network may further comprise a plurality of third 3D convolutional layers, the output of the plurality of third 3D convolutional layers being connected to the at least one fully connected layer. The plurality of third 3D convolutional layers may be configured to process one or more 3D positional features associated with voxels of at least the first block of voxels that is provided to the input of the plurality of first 3D convolutional layers.

In an embodiment, the first deep neural network may be trained on the basis of a training set, the training set including 3D image data of dento-maxillofacial structures, one or more 3D positional features derived from the 3D image data and one or more 3D models of parts of the dento-maxillofacial structures of the 3D image data of the training set, wherein the one or more 3D models may be used as target during training of the first deep neural network. In an embodiment, at least part of the one or more 3D models may be generated by optically scanning parts of the dento-maxillofacial structures of the 3D image data of the training set. Hence, instead of manually segmented 3D image data, optically scanned 3D models are used for training the neural network, thus providing high resolution, accurate modules which can be used as target data.

In an embodiment, the determination of one or more 3D positional features may include: determining a cloud of points of accumulated intensities values in a plane of the image volume, preferably the plane being an axial plane, wherein an accumulated intensity value at a point in the plane may be determined by summing voxel values of voxels positioned on or within the proximity of the normal that runs through the point in the axial plane; determining accumulated intensity values in the plane that are above a predetermined value; and, fitting a curve through the determined accumulated intensity values, the curve approximating at least part of a dental arch in the dento-maxillofacial structure represented by the 3D data image. Hence, dental structures such as a dental arch may be determined by summing intensity values of voxels positioned in a direction normal of a plane, e.g. an axial plane.

In an embodiment, the one or more 3D positional features may include a first 3D positional feature defining a relative distance in a plane in the image volume, preferably an axial plane in the image volume, between voxels in the plane and an origin on a dental arch curve defined in the plane. In an embodiment, the origin may be defined as a point on the dental arch curve where the derivative of the curve is zero.

In an embodiment, the one or more 3D positional features include a second 3D positional feature defining a relative distance in a plane in the image volume, preferably an axial plane in the image volume, the distance being the shortest distance in an axial plane between voxels in the axial plane and the dental arch curve.

In an embodiment, 3D positional features may be determined based on automatic feature generation using the entire or a substantial part of the 3D input data. In an embodiment, automatic feature generation may include a 3D deep neural network performing a pre-segmentation on a down-sampled version of the entire or a substantial part of the 3D input data.

In an embodiment, the first deep neural network may comprise a first data processing path including at least a first set of 3D convolutional layers, preferably a first set of 3D CNN feature layers, configured to determine progressively higher abstractions of information useful for deriving the classification of voxels, and a second data processing path parallel to the first path, the second path comprising a second set of 3D convolutional layers, preferably a second set of 3D CNN feature layers, wherein the second set of 3D convolutional layers may be configured to determine progressively higher abstractions of information useful for deriving the classification of voxels making use of spatial contextually larger representations of blocks of voxels that are fed to the input of the first set of 3D convolutional layers.

Hence, the second set of 3D CNN feature layers may process voxels in order to generate 3D feature maps that includes information about the direct neighborhood of associated voxels that are processed by the first 3D CNN feature layers. This way, the second path enables the neural network to determine contextual information, i.e. information about the context (e.g. surroundings) of voxels of the 3D image data that are presented to the input of the neural network. By using two paths or even more paths, both the 3D image data (the input data) and contextual information about voxels of the 3D image data can be processed in parallel. The contextual information is important for classifying dento-maxillofacial structures, which typically include closely packed dental structures that are difficult to distinguish.

In an embodiment, the first deep neural network may further comprise a third data processing path including a third set of 3D convolutional layers, preferably a third set of 3D CNN feature layers, parallel to the first and second path, for receiving the one or more 3D positional features associated with the 3D image data, the third set of 3D convolutional layers being configured to encode relevant information from the aggregation of information from the entire received 3D data set, associated with blocks of voxels that are fed to the input of the first set of 3D convolutional layers.

In an embodiment, instead of using a third data processing path, the 3D positional features may be added to the first voxel representation such that it is paired with voxels of the first voxel representation, e.g. by means of adding the 3D positional feature information as additional channels to the received 3D image information.

In an embodiment, the output of the first, second and (optionally) third set of 3D convolutional layers may be provided to the input of a set of fully connected convolutional layers which are configured to classify at least part of the voxels in the image volume into at least one of jaw, teeth and/or nerve voxels.

In an embodiment, the method may further comprise: a third deep neural network post-processing the voxels classified by the first deep neural network, the post-processing including correcting voxels that are incorrectly classified by the first deep neural network. In an embodiment, the second neural network may be trained using voxels that are classified during the training of the first deep neural network as input and using the one or more 3D models of parts of the dento-maxillofacial structures of the 3D image data of the training set as a target. Hence, in this embodiment, a second convolutional neural network may be trained to correct voxels classified by the first neural network. This way, very accurate 3D models of individual parts of the a dento-maxillofacial structure may be determined, including 3D models of teeth and jaws.

In an aspect, the invention may relate to a computer-implemented method for training a deep learning neural network system to process 3D image data of a dento-maxillofacial structure. In an embodiment, the method may include: a computer receiving training data, the training data including: 3D input data, preferably 3D cone beam CT (CBCT) image data, the 3D input data defining one or more voxel representations of one or more dento-maxillofacial structures respectively, a voxel being associated with a radiation intensity value, the voxels of a voxel representation defining an image volume; the computer using a pre-processing algorithm to pre-process the one or more voxel representations of the one or more dento-maxillofacial structures respectively to determine one or more 3D positional features for voxels in the one or more voxel representations, a 3D positional feature defining information about a position of at least one voxel of a voxel representation of a dento-maxillofacial structures relative to the position of a dental reference plane (e.g. an axial plane positioned relative to a jaw) or the position of a dental reference object (e.g. a jaw, a dental arch and/or one or more teeth) in the image volume; and, using the training data and the one or more 3D positional features to train the first deep neural network to classify voxels into jaw, teeth and/or nerve voxels.

In an embodiment, the training data may further include: one or more 3D models of parts of the dento-maxillofacial structures represented by the 3D input data of the training data. In an embodiment, at least part of the one or more 3D models may be generated by optically scanning parts of the dento-maxillofacial structures of the 3D image data of the training data. In an embodiment, the one or more 3D models may be used as target during training of the first deep neural network.

In an embodiment, the method may include: using voxels that are classified during the training of the first deep neural network and the one or more 3D models of parts of the dento-maxillofacial structures of the 3D image data of the training set to train a second neural network to post-process voxels classified by the first deep neural network, the post-processing including correcting voxels that are incorrectly classified by the first deep neural network.

In a further aspect, the invention may relate to a computer system adapted to process 3D image data of a dento-maxillofacial structure comprising: a computer readable storage medium having computer readable program code embodied therewith, the computer readable program code including a pre-processing algorithm and a first first deep neural network; and a processor, preferably a microprocessor, coupled to the computer readable storage medium, wherein responsive to executing the computer readable program code, the processor is configured to perform executable operations comprising: receiving 3D input data, preferably 3D cone beam CT (CBCT) data, the 3D input data including a first voxel representation of the dento-maxillofacial structure, a voxel being associated with a radiation intensity value, the voxels of the voxel representation defining an image volume; a pre-processing algorithm using the 3D input data to determine one or more 3D positional features of the dento-maxillofacial structure, a 3D positional feature defining information about positions of voxels of the first voxel representation relative to the position of a dental reference plane, e.g. an axial plane positioned relative to a jaw, or the position of a dental reference object, e.g. a jaw, a dental arch and/or one or more teeth, in the image volume; providing the first voxel representation and the one or more 3D positional features associated with the first voxel representation to the input of a first 3D deep neural network, preferably a 3D convolutional deep neural network, the first deep neural network being configured to classify voxels of the first voxel representation into at least jaw, teeth, and/or nerve voxels; the first neural network being trained on the basis of a training set, the training set including 3D image data of dento-maxillofacial structures and one or more 3D positional features derived from the 3D image data of the training set; and, receiving classified voxels of the first voxel representation from the output of the first 3D deep neural network and determining a voxel representation of at least one of the jaw, teeth and/or nerve tissue of the dento-maxillofacial structure on the basis of the classified voxels.

In an embodiment, the training set may further comprise one or more 3D models of parts of the dento-maxillofacial structures of the 3D image data of the training set, In an embodiment, at least part of the one or more 3D models may be generated by optically scanning parts of the dento-maxillofacial structures of the 3D image data of the training set. In an embodiment, the one or more 3D models may be used as target during training of the first deep neural network.

In an embodiment, the pre-processing algorithm may include a second 3D deep neural network, the second deep neural network being trained to receive a second voxel representation at its input, and, to determine for each voxel of the second voxel representation a 3D positional feature, preferably the 3D positional feature including a measure indicating a likelihood that a voxel represents jaw, teeth and/or nerve tissue, wherein the second voxel representation is a low-resolution version of the first voxel representation, preferably the resolution of the second voxel representation being at least three times lower than the resolution of the first voxel presentation, preferably the second 3D deep neural network being trained based on the 3D image data of dento-maxillofacial structures and the one or more 3D models of parts of the dento-maxillofacial structures of the 3D image data of the training set of the training set for training the first deep neural network.

In an embodiment, the first deep neural network may comprise: a plurality of first 3D convolutional layers, the output of the plurality of first 3D convolutional layers being connected to at least one fully connected layer, wherein the plurality of first 3D convolutional layers are configured to process a first block of voxels from the first voxel representation and wherein the at least one fully connected layer is configured to classify voxels of the first block of voxels into at least one of jaw, teeth and/or nerve voxels, preferably each voxel provided to the input of the first deep neural network comprising a radiation intensity value and at least one 3D positional feature In an embodiment, the first deep neural network may further comprise: a plurality of second 3D convolutional layers, the output of the plurality of second 3D convolutional layers being connected to the at least one fully connected layer, wherein the plurality of second 3D convolutional layers are configured to process a second block of voxels from the first voxel representation, the first and second block of voxels having the same or substantially the same center point in the image volume and the second block of voxels representing a volume in real-world dimensions that is larger than the volume in real-world dimensions of the first block of voxels, the plurality of second 3D convolutional layers being configured to determine contextual information associated with voxels of the first block of voxels that is provided to the input of the plurality of first 3D convolutional layers.

The invention may also relate of a computer program product comprising software code portions configured for, when run in the memory of a computer, executing any of the method as described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 7A-7E depict examples of 3D positional features according to various embodiments of the invention;

DETAILED DESCRIPTION

In this disclosure embodiments are described of computer systems and computer-implemented methods that use deep neural networks for classifying, segmenting and 3D modelling of dento-maxillofacial structures on the basis of 3D image data, e.g. 3D image data defined by a sequence of images forming a CT image data stack, in particular a cone beam CT (CBCT) image data stack. The 3D image data may comprise voxels forming a 3D image space of a dento-maxillofacial structure. A computer system according to the invention may comprise at least one deep neural network which is trained to classify a 3D image data stack of a dento-maxillofacial structure into voxels of different classes, wherein each class may be associated with a distinct part (e.g. teeth, jaw, nerve) of the structure. The computer system may be configured to execute a training process which iteratively trains (optimizes) one or more deep neural networks on the basis of one or more training sets which may include accurate 3D models of dento-maxillofacial structures. These 3D models may include optically scanned dento-maxillofacial structures (teeth and/or jaw bone).

Once trained, the deep neural network may receive a 3D image data stack of a dento-maxillofacial structure and classify the voxels of the 3D image data stack. Before the data is presented to the trained deep neural network, the data may be pre-processed so that the neural network can efficiently and accurately classify voxels. The output of the neural network may include different collections of voxel data, wherein each collection may represent a distinct part e.g. teeth or jaw bone of the 3D image data. The classified voxels may be post-processed in order to reconstruct an accurate 3D model of the dento-maxillofacial structure.

The computer system comprising a trained neural network for automatically classifying voxels of dento-maxillofacial structures, the training of the network, the pre-processing of the 3D image data before it is fed to the neural network as well as the post-processing of voxels that are classified by the neural network are described hereunder in more detail.

Figure 1:
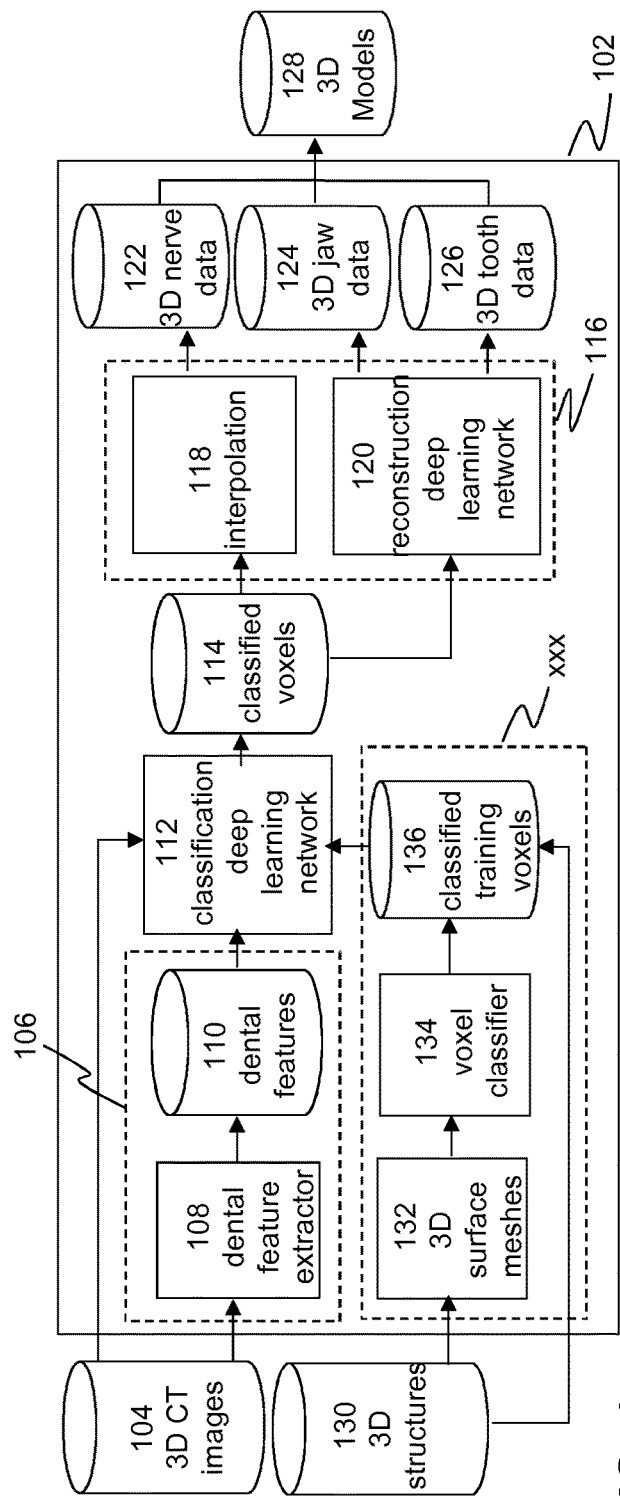
FIG. 1 schematically depicts a computer system for classification and segmentation of 3D dento-maxillofacial structures according to an embodiment of the invention.

FIG. 1 schematically depicts a computer system for classification and segmentation of 3D dento-maxillofacial structures according to an embodiment of the invention. In particular, the computer system 102 may be configured to receive a 3D image data stack 104 of a dento-maxillofacial structure. The structure may include jaw-, teeth- and nerve structures. The 3D image data may comprise voxels, i.e. 3D space elements associated with a voxel value, e.g. a grayscale value or a colour value, representing a radiation intensity or density value. Preferably the 3D image data stack may include a CBCT image data according a predetermined format, e.g. the DICOM format or a derivative thereof.

The computer system may comprise a pre-processor 106 for pre-processing the 3D image data before it is fed to the input of a first 3D deep learning neural network 112, which is trained to produce a 3D set of classified voxels as an output 114. As will be described hereunder in more detail, the 3D deep learning neural network may be trained according to a predetermined training scheme so that the trained neural network is capable of accurately classifying voxels in the 3D image data stack into voxels of different classes (e.g. voxels associated with teeth-, jaw bone and/or nerve tissue). The 3D deep learning neural network may comprise a plurality of connected 3D convolutional neural network (3D CNN) layers.

The computer system may further comprise a post-processor 116 for accurately reconstructing 3D models of different parts of the dento-maxillofacial structure (e.g. tooth, jaw and nerve) using the voxels classified by the 3D deep learning neural network. As will be described hereunder in greater detail, part of the classified voxels, e.g. voxels that are classified as belonging to a tooth structure or a jaw structure are input to a further second 3D deep learning neural network 120, which is trained to reconstruct 3D volumes for the dento-maxillofacial structures, e.g. the shape of the jaw 124 and the shape of the teeth 126, on the basis of the voxels that were classified to belong to such structures. Other parts of the classified voxels, e.g. voxels that were classified by the 3D deep neural network as belonging to nerves may be post-processed by using an interpolation function 118 and stored as 3D nerve data 122. The task of determining the volume representing a nerve from the classified voxels is of a nature that is currently beyond the capacity of (the processing power available to) a deep neural network. Furthermore, the presented classified voxels might not contain the information that would be suitable for a neural network to resolve this particular problem. Therefore, in order to accurately and efficiently post-process the classified nerve voxels an interpolation of the classified voxels is used. After post-processing the 3D data of the various parts of the dento-maxillofacial structure, the nerve, jaw and tooth data 122-126 may be combined and formatted in separate 3D models 128 that accurately represent the dento-maxillofacial structures in the 3D image data that were fed to the input of the computer system.

In CBCT scans the radio density (measured in Hounsfield Units (HU)) is inaccurate because different areas in the scan appear with different greyscale values depending on their relative positions in the organ being scanned. HU measured from the same anatomical area with both CBCT and medical-grade CT scanners are not identical and are thus unreliable for determination of site-specific, radiographically-identified bone density.

Moreover, dental CBCT systems do not employ a standardized system for scaling the grey levels that represent the reconstructed density values. These values are as such arbitrary and do not allow for assessment of bone quality. In the absence of such a standardization, it is difficult to interpret the grey levels or impossible to compare the values resulting from different machines.

The teeth and jaw bone structure have similar density so that it is difficult for a computer to distinguish between voxels belonging to teeth and voxel belonging to a jaw. Additionally, CBCT systems are very sensitive for so-called beam hardening which produce dark streaks between two high attenuation objects (such as metal or bone), with surrounding bright streaks.

In order to make the 3D deep learning neural network robust against the above-mentioned problems, the 3D neural network may be trained using a module 138 to make use of 3D models of parts of the dento-maxillofacial structure as represented by the 3D image data. The 3D training data 130 may be correctly aligned to a CBCT image presented at 104 for which the associated target output is known (e.g. 3D CT image data of a dento-maxillofacial structure and an associated 3D segmented representation of the dento-maxillofacial structure). Conventional 3D training data may be obtained by manually segmenting the input data, which may represent a significant amount of work. Additionally, manual segmentation results in a low reproducibility and consistency of input data to be used.

In order to counter this problem, in an embodiment, optically produced training data 130, i.e. accurate 3D models of (parts of) dento-maxillofacial structure may be used instead or at least in addition to manually segmented training data. Dento-maxillofacial structures that are used for producing the trainings data may be scanned using a 3D optical scanner. Such optical 3D scanners are known in the art and can be used to produce high-quality 3D jaw and tooth surface data. The 3D surface data may include 3D surface meshes 132 which may be filled (determining which specific voxels are part of the volume encompassed by the mesh) and used by a voxel classifier 134. This way, the voxel classifier is able to generate high-quality classified voxels for training 136. Additionally, as mentioned above, manually classified training voxels may be used by the training module to train the network as well. The training module may use the classified training voxels as a target and associated CT training data as an input.

Additionally, during the training process, the CT training data may be pre-processed by a feature extractor 108, which may be configured to determine 3D positional features. A dento-maxillofacial feature may encode at least spatial information associated with one or more parts of the imaged dento-maxillofacial structure (the received 3D data set). For example, in an embodiment, a manually engineered 3D positional feature may include a 3D curve representing (part of) the jaw bone, in particular the dental arch, in the 3D volume that contains the voxels. One or more weight parameters may be assigned to points along the 3D curve. The value of a weight value may be used to encode a translation in the 3D space from voxel to voxel. Rather than incorporating e.g. an encoded version of the original space the image stack is received in, the space encoded is specific to the dento-maxillofacial structures as detected in the input. The feature extractor may determine one or more curves approximating one of more curves of the jaw and/or teeth (e.g. the dental arch) by examining the voxel values which represent radiation intensity or density values and fitting one or more curves (e.g. a polynomial) through certain voxels. Derivatives of (parts of) dental arch curves of a 3D CT image data stack may be stored as a positional feature mapping 110.

In another embodiment such 3D positional features may for example be determined by means of a (trained) machine learning method such as a 3D deep neural network designed to derive relevant information from the entire received 3D data set.

Figure 2:
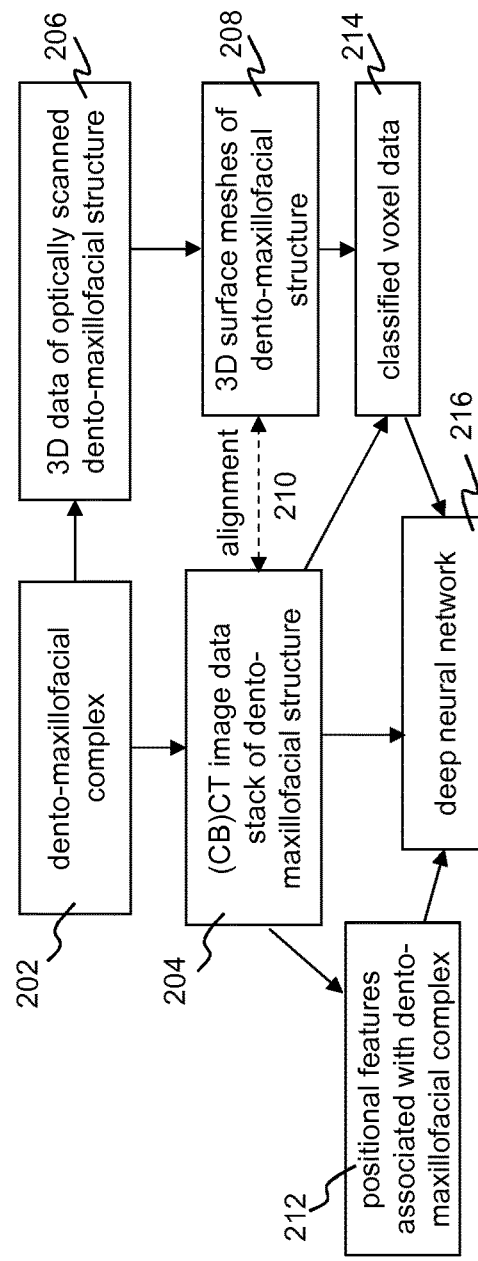
FIG. 2 depicts a flow diagram of training a deep neural network for classifying dento-maxillofacial 3D image data according to an embodiment of the invention.
Figure 3B:
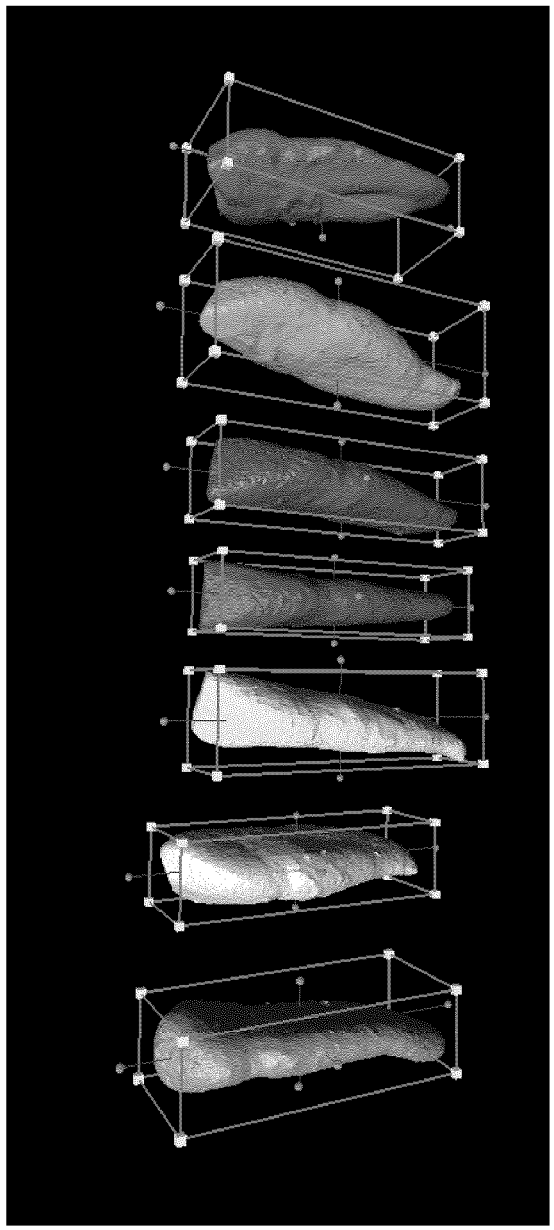
FIGS. 3A and 3B depict examples of 3D CT image data and 3D optical scanning data respectively.
Figure 3A:
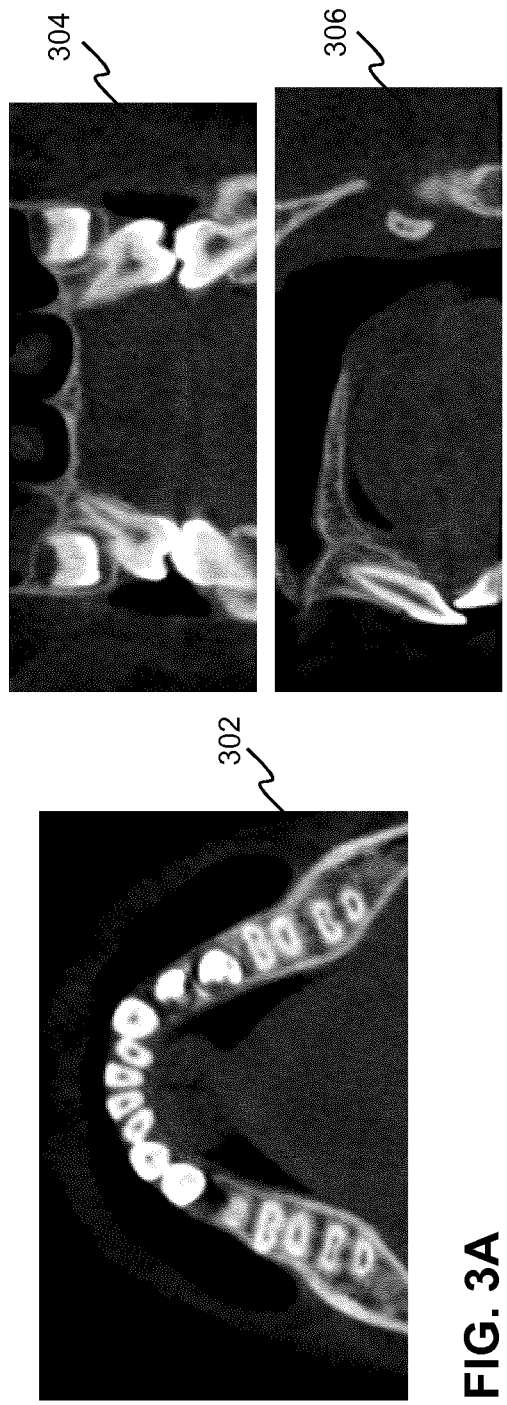

FIG. 2 depicts a flow diagram of training a deep neural network for classifying dento-maxillofacial 3D image data according to an embodiment of the invention. Training data is used in order to train a 3D deep learning neural network so that it is able to automatically classify voxels of a 3D CT scan of a dento-maxillofacial structure. As shown in this figure, a representation of a dento-maxillofacial complex 202 may be provided to the computer system. The training data may include a CT image data stack 204 of a dento-maxillofacial structure and an associated 3D model, e.g. 3D data 206 from optical scanning of the same dento-maxillofacial structure. Examples of such 3D CT image data and 3D optical scanning data are shown in FIGS. 3A and 3B. FIG. 3A depicts DICOM slices associated with different planes of a 3D CT scan of a dento-maxillofacial structure, e.g. an axial plane 302, a frontal or coronal plane 304 and the sagittal plane 306. FIG. 3B depicts 3D optical scanning data of a dento-maxillofacial structure. The computer may form 3D surface meshes 208 of the dento-maxillofacial structure on the basis of the optical scanning data. Further, an alignment function 210 may be employed which is configured to align the 3D surface meshes to the 3D CT image data. After alignment, the representations of 3D structures that are provided to the input of the computer use the same spatial coordinate system. Based on the aligned CT image data and 3D surface meshes positional features 212 and classified voxel data of the optically scanned 3D model 214 may be determined. The positional features and classified voxel data may than be provided to the input of the deep neural network 216, together with the image stack 204.

Hence, during the training phase, the 3D deep learning neural network receives 3D CT training data and positional features extracted from the 3D CT training data as input data and the classified training voxels associated with the 3D CT trainings data are used as target data. An optimization method may be used to learn the optimal values of the network parameters of the deep neural network by minimizing a loss function which represents the deviation the output of the deep neural network to the target data (i.e. classified voxel data), representing the desired output for a predetermined input. When the minimization of the loss function converges to a certain value, the training process could be considered to be suitable for application.

The training process depicted in FIG. 2 using 3D positional features in combination with the training voxels, which may be (at least partly) derived from 3D optically scanning data, provides a high-quality training set for the 3D deep learning neural network. After the training process, the trained network is capable of accurately classifying voxels from an 3D CT image data stack.

Figure 4A:
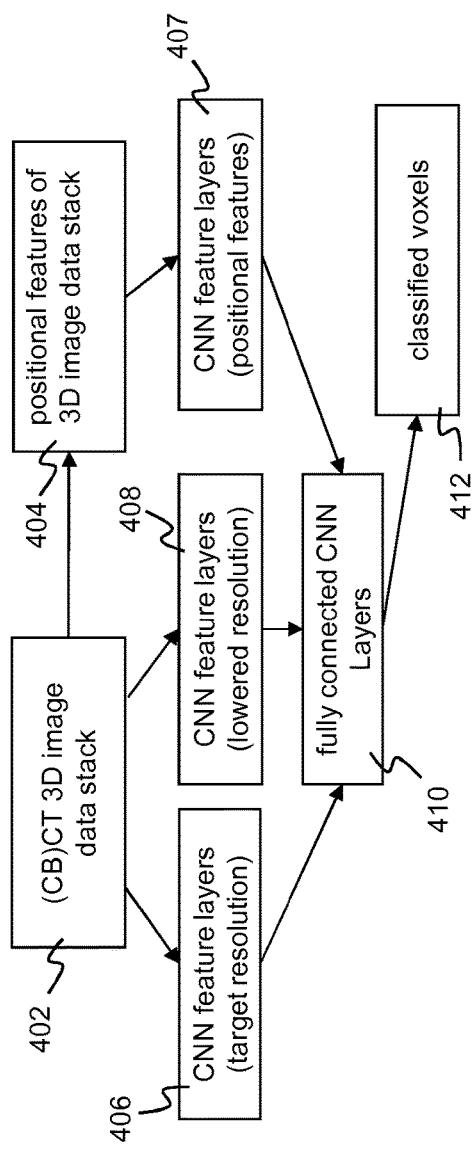
FIGS. 4A and 4B depict examples of deep neural network architectures for classifying dento-maxillofacial 3D image data.
Figure 4B:
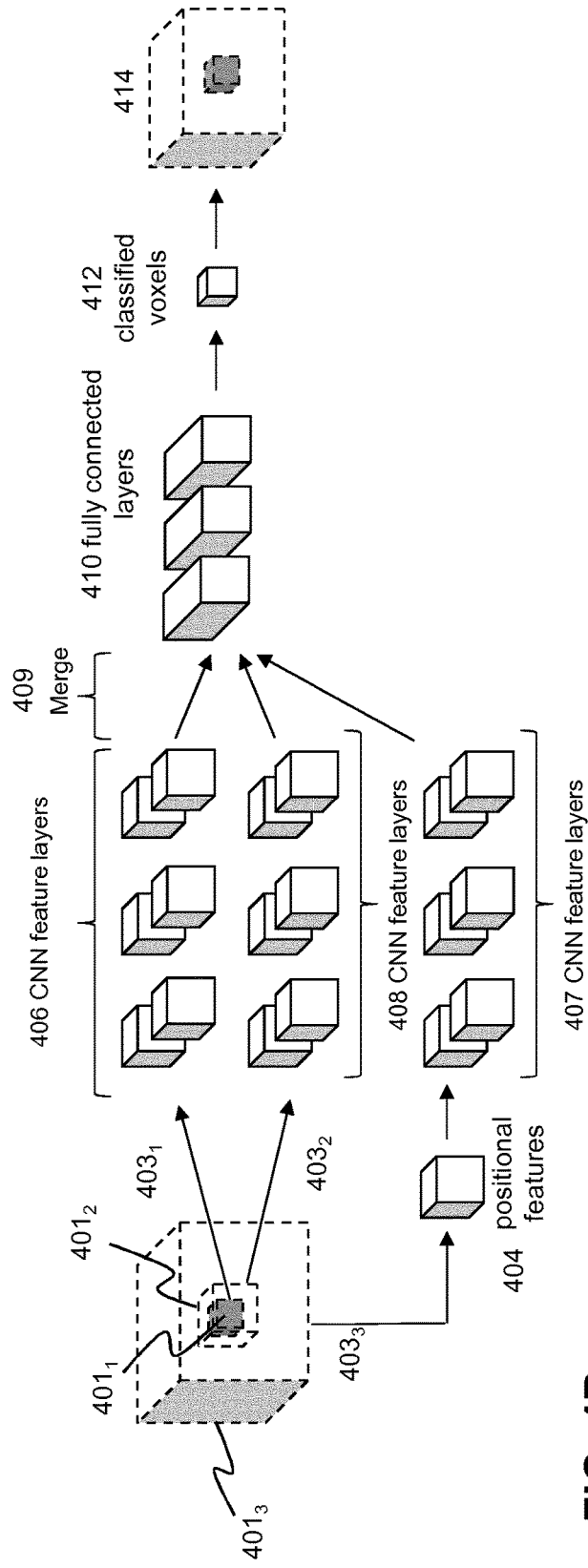

FIGS. 4A and 4B depict high-level schematics of deep neural network architectures for use in the methods and systems described in this disclosure. The deep neural networks may be implemented using one or more 3D convolutional neural networks (3D CNNs). The convolutional layers may employ an activation function associated with the neurons in the layers such as a sigmoid function, tan h function, relu function, softmax function, etc. A deep neural network may include a plurality of 3D convolutional layers wherein minor variations in the number of layers and their defining parameters, e.g. differing activation functions, kernel amounts and sizes, and additional functional layers such as dropout and batch normalization layers may be used in the implementation without losing the essence of the design of the deep neural network.

As shown in FIG. 4A, the network may include a plurality of convolutional paths wherein each convolutional path is associated with a set of 3D convolutional layers. In an embodiment, the network may include at least two convolutional paths, a first convolutional path associated with a first set of 3D convolutional layers 406 and a second convolutional path associated with a second set of 3D convolutional layers 408. The first and second convolutional paths may be trained to encode 3D features derived from received 3D image data associated with the voxels that are offered to the input of the first and second convolution paths respectively. Further, in some embodiments, the network may include at least a further (third) convolutional path associated with a third set of 3D convolutional layers 407. The third convolutional path may be trained to encode 3D features derived from received 3D positional feature data associated with voxels that are offered to the input of the third path.

Alternatively, in another embodiment, instead of a further convolution path that is trained on the basis of 3D positional feature data, the 3D positional feature data may be associated with the intensity values of voxels that are offered to the input of the first and second convolution paths. Hence, in this embodiment, the first and second convolutional paths may be trained based on training data including a 3D data stack of voxel values including intensity values and positional feature information.

The function of the different paths is illustrated in more detail in FIG. 4B. As shown in this figure, voxels are fed to the input of the neural network. These voxels are associated with a predetermined volume, which may be referred to as the image volume $401_3$. The total volume of voxels may be divided in first blocks of voxels and 3D convolution layers of the first path $403_1$ may perform a 3D convolution operation on each of the first blocks of voxels $401_1$ of the 3D image data. During the processing, the output of each 3D convolution layer may be the input of a subsequent 3D convolution layer. This way, each 3D convolutional layer may generate a 3D feature map representing features of the 3D image data that are fed to the input. A 3D convolutional layer that is configured to generate such feature maps may therefore be referred to as a 3D CNN feature layer.

As shown in FIG. 4B, the convolutional layers of the second convolutional path $403_2$ may be configured to process second blocks of voxels $401_2$ of the 3D image data. Each second block of voxels is associated with a first block of voxels, wherein the first and second block of voxels have the same centered origin in the image volume. The volume of the second block is larger than the volume of the first block. Moreover, the second block of voxels represents a down-sampled version of an associated first block of voxels. The down-sampling may be based using a well-known interpolation algorithm. The down-sampling factor may be any appropriate value. In an embodiment, the down-sampling factor may be selected between 20 and 2, preferably between 10 and 3.

Hence, the 3D deep neural network may comprise at least two convolutional paths. A first convolutional path $403_1$ may define a first set of 3D CNN feature layers (e.g. 5-20 layers), which are configured to process input data (e.g. first blocks of voxels at predetermined positions in the image volume) at a first voxel resolution, e.g. the voxel resolution of the target (i.e. the resolution of the voxels of the 3D image data to be classified). Similarly, a second convolutional path may define a second set of 3D CNN feature layers (e.g. 5-20 layers), which are configured to process input data at a second voxel resolution (e.g. second blocks of voxels wherein each block of the second blocks of voxels $401_2$ has the same center point as its associated block from the first block of voxels $401_1$). Here, the second resolution is lower than the first resolution. Hence, the second blocks of voxels represent a larger volume in real-world dimensions than the first blocks. This way, the second 3D CNN feature layers process voxels in order to generate 3D feature maps that includes information about the (direct) neighborhood of associated voxels that are processed by the first 3D CNN feature layers.

The second path thus enables the neural network to determine contextual information, i.e. information about the context (e.g. its surroundings) of voxels of the 3D image data that are presented to the input of the neural network. By using multiple (parallel) convolutional paths, both the 3D image data (the input data) and the contextual information about voxels of the 3D image data can be processed in parallel. The contextual information is useful for classifying a dento-maxillofacial structures, which typically include closely packed dental structures that are difficult to distinguish, especially in case of CBCT image data.

In an embodiment, the neural network of 4B may further include a third convolutional path $403_3$ of a third set of 3D convolutional layers which are trained to process specific representations of 3D positional features 404 that may be extracted from the 3D image data. Extraction of the 3D positional features from the 3D image data may be realized as a pre-processing step. In an alternative embodiment, instead of using a third convolutional path for processing 3D positional features, the 3D positional information, including 3D positional features, may be associated with the 3D image data that is offered to the input of the deep neural network. In particular, a 3D data stack may be formed in which each voxel is associated with an intensity value and positional information. Thus, the positional information may be paired per applicable received voxel, e.g. by means of adding the 3D positional feature information as additional channels to the received 3D image information. Hence, in this embodiment, a voxel of a voxel representation of a 3D dento-maxillofacial structure at the input of the deep neural network may not only be associated with a voxel value representing e.g. a radio intensity value, but also with 3D positional information. Thus, in this embodiment, during the training of the convolutional layers of the first and second convolutional path both, information derived from both 3D image features and 3D positional features may be encoded in these convolutional layers.

The output of the sets of 3D CNN feature layers are then merged and fed to the input of a set of fully connected 3D CNN layers 410, which are trained to derive the intended classification of voxels 412 that are offered at the input of the neural network and processed by the 3D CNN feature layers.

The sets of 3D CNN feature layers are trained (through their learnable parameters) to derive and pass on the optimally useful information that can be determined from their specific input, the fully connected layers encode parameters that will determine the way the information from the previous paths should be combined to provide optimally classified voxels 412. Thereafter, classified voxels may be presented in the image space 414. Hence, the output of the neural network are classified voxels in an image space that corresponds to the image space of the voxels at the input.

Here, the output (the last layer) of the fully connected layers may provide a plurality of activations for each voxel. Such a voxel activation may represent a probability measure (a prediction) defining the probability that a voxel belongs to one of a plurality of classes, e.g. dental structure classes, e.g. a tooth, jaw and/or nerve structure. For each voxel, voxel activations associated with different dental structures may be thresholded in order to obtain a classified voxel.

Figure 6:
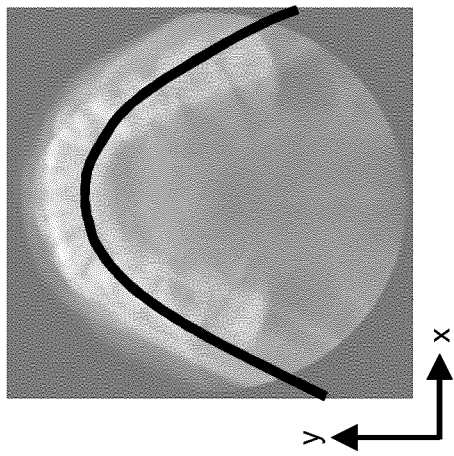
FIG. 6 provides a visualization containing the summed voxel values from a 3D image stack and a curve fitted to voxels representing a dento-maxillofacial arch.
Figure 5A:
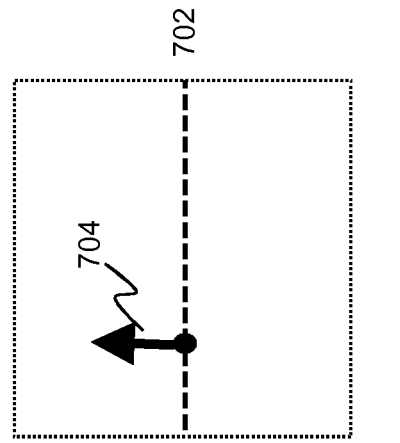
FIGS. 5A and 5B illustrate methods of determining 3D positional features according to various embodiments of the invention.
Figure 5A:
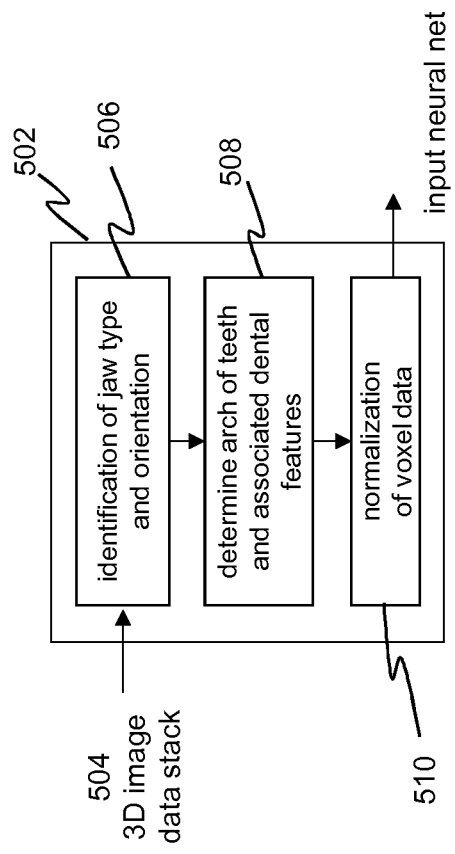

FIG. 5-7 illustrate methods of determining 3D positional features in a 3D image data stack representing a 3D dento-maxillofacial structure and examples of such positional features. Specifically, in the case of manually engineered features, and as described with reference to FIG. 1, both the 3D image data stack and the associated 3D positional features are offered as input to the 3D deep neural network so that the network can accurately classify the voxels without the risk of overfitting. A conversion based on real-world dimensions ensures comparable input irrespective of input image resolution.

A manually engineered 3D positional feature may provide the 3D deep neural network information about positions of voxels in the image volume relative to a reference plane or a reference object in the image volume. For example, in an embodiment, a reference plane may be an axial plane in the image volume separating voxels associated with the upper jaw and voxels with the lower jaw. In another embodiment, a reference object may include a curve, e.g. a 3D curve, approximating at least part of a dental arch of teeth in the 3D image data of the dento-maxillofacial structure. This way, the positional features provide the first deep neural network the means to encode abstractions indicating a likelihood per voxel associated jaw, teeth and/or nerve tissues in different positions in the image volume. These positional features may help the deep neural network to efficiently and accurately classify voxels of a 3D image data stack and are designed to reduce the risk of overfitting.

In order to determine reference planes and/or reference objects in the image volume that are useful in the classification process, the feature analysis function may determine voxels of a predetermined intensity value or above or below a predetermined intensity value. For example, voxels associated with bright intensity values may relate to teeth and/or jaw tissue. This way, information about the position of the teeth and/or jaw and the orientation (e.g. a rotational angle) in the image volume may be determined by the computer. If the feature analysis function determines that the rotation angle is larger than a predetermined amount (e.g. larger than 15 degrees), the function may correct the rotation angle to zero as this is more beneficial for accurate results.

FIG. 5A illustrates an example of a flow diagram 502 of a method of determining manually engineered 3D positional features in a 3D image data 504, e.g. a 3D CT image data stack. This process may include determining one or more 3D positional features of the dento-maxillofacial structure, wherein one or more 3D positional features being configured for input to the 3D deep neural network (as discussed with reference to FIG. 4B above). A manually engineered 3D positional feature defines position information of voxels in the image volume with respect to reference planes or reference objects in the image volume, for example, a distance, e.g. a perpendicular distance, between voxels in the image volume and a reference plane in the image volume which separates the upper jaw from the low jaw. It may also define distance between voxels in the image volume and a dental reference object, e.g. a dental arch in the image volume. It may further define positions of accumulated intensity values in a second reference plane of the image volume, an accumulated intensity value at a point in the second reference plane including accumulated intensity values of voxels on or in the proximity of the normal running through the point in the reference plane. Examples of 3D positional features are described hereunder.

In order to determine a reference object that provides positional information of the dental arch in the 3D image data of the dento-maxillofacial structure. A fitting algorithm may be used to determine a curve, e.g. a curve that follows a polynomial formula, that fits predetermined points in a cloud of points of different (accumulated) intensity values.

In an embodiment, a cloud of points of intensity values in an axial plane (an xy plane) of the image volume may be determined. An accumulated intensity value of a point in such axial plane may be determined by summing voxel values of voxels positioned on the normal that runs through a point in the axial plane. The thus obtained intensity values in the axial plane may be used to find a curve that approximates a dental arch of the teeth.

Figure 5B:
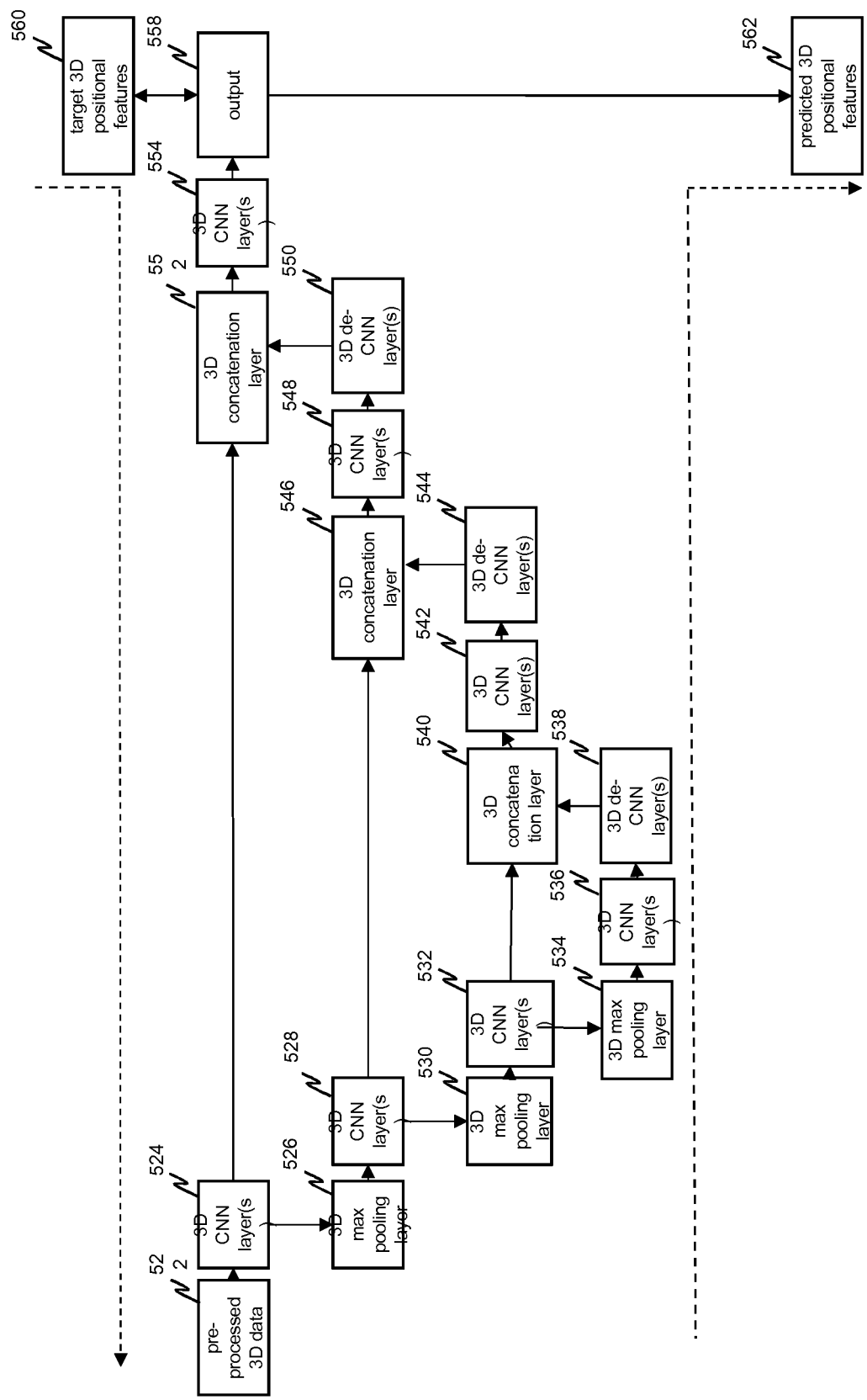

FIG. 5B depicts an example of a machine learning method as may be utilized to generate (non-manually engineered) relevant 3D positional features according to an embodiment of the invention. In particular, FIG. 5B depicts an exemplary 3D deep neural network architecture as may be trained to generate desired features to be processed by the segmentation 3D neural network. After training, such trained model may be employed analogous to method 502 as a pre-processor that derives relevant 3D positional features based on the entire received 3D data set.

As with the manually engineered 3D positional features, the aim is to incorporate into the 3D positional features information considering the entire received 3D data set (or at least a substantial part thereof) for use in the segmentation 3D deep learning network that is potentially relevant for the task of automated classification and segmentation, and may not otherwise be available from the set or sets of subsamples offered to the segmentation 3D deep learning network. Again, as with the manually engineered 3D positional features, such information should be made available per voxel in the received 3D data set.

One of the possible ways to implement such machine learning method for automatically generating 3D positional features is a trained deep neural network. Such network may be trained to derive 3D positional features on the basis of an input 3D data set (e.g. a voxel representation of a dento-maxillofacial structure) that is offered to the input of the 3D segmentation deep neural network. In an embodiment, the pre-processing deep neural network may be a 3D U-net type deep neural network as illustrated by FIG. 5B. Due to the limits of processing available (mostly memory requirements), such an architecture would not operate on the resolutions of the received voxel representations. Therefore, a first input 3D data set, a first voxel representation of a first resolution (e.g. 0.2×0.2×0.2 mm per voxel) may be down sampled to a second voxel representation of a second lower resolution, e.g. a resolution of 1×1×1 mm per voxel, using an interpolation algorithm. Thereafter, a 3D deep neural network that is trained on the basis of voxel representations of the second resolution may generate per input voxel 3D positional feature information. An interpolation algorithm may be used to scale this information up to the original first resolution. This way the resulting 3D positional features (spatially) coincide with the voxels of the first voxel representation yielding relevant information for each voxel of the first input 3D data set whilst taking into account information considering (an aggregated version of) the entire received 3D data set.

Such pre-preprocessing 3D deep neural network may be trained to approximate desired target values (being the desired 3D positional features). In this specific example the targets may for instance be a class indication per voxel on the resolution at which the pre-processing 3D deep neural network operates. Such class indications may for instance be sourced from the same pool of classified training voxels 136, but down-sampled in the same manner as the received 3D data set has been down-sampled.

Note that such exemplary implementation of a pre-processing machine learning method could effectively be considered as a coarse pre-segmentation, specifically one that potentially has access to information from the entire (or a substantial part of the) received 3D voxel representation. Pairing the course pre-segmentation information to the applicable voxels of the received 3D image space, e.g. by means of upscaling, leads to these 3D positional features being processed in parallel with the received 3D image data, towards an outcome at the received 3D image resolution.

The pre-processing network may be implemented using a variety of 3D neural network layers, such as convolutional layers (3D CNNs), 3D max-pooling layers, 3D deconvolutional layers (3D de-CNNs), and densely connected layers. The layers may use a variety of activation functions such as linear, tan h, ReLU, PreLU, sigmoid, etc. The 3D CNN and de-CNN layers may vary in their amount of filters, filter sizes and subsampling parameters. The 3D CNN and de-CNN layers, as well as the densely-connected layers, may vary in their parameter initialization methods. Dropout and/or batch normalisation layers may be employed throughout the architecture.

Following a 3D U-net architecture, during training the various filters within the 3D CNN and 3D de-CNN layers learn to encode meaningful features as would aid the effort of prediction accuracy. During training, matching sets of 3D image data 522 and encoded matching 3D positional features 560 are used to optimize towards prediction of the latter from the former. A loss function may be employed as a measure to be minimized. This optimization effort may be aided be making use of optimizers such as SGD, Adam, etc.

Such an architecture may employ various internal resolution scales, effectively downscaling 526, 530, 534 as results from a previous set of 3D CNN layers 524, 528, 532 through e.g. max pooling or subsampled 3D convolutions. The term 'meaningful features' here refers to (successive) derivations of information relevant to determining the target output values, and are also encoded through the 3D de-CNN layers, which effectively perform an upscaling whilst employing filters. By combining 540, 546, 552 data resulting from such 3D de-CNN layers 538, 544, 554 with the data from the 'last' 3D CNN layers operating on the same resolution (532 to 540, 528 to 546 and 524 to 552), highly accurate predictions may be achieved. Throughout the upscaling path, additional 3D CNN layers may be used 542, 548, 554.

When being utilized for inference, having been trained to have encoded internal parameters in such a way that validation yields sufficiently accurate results, an input sample may be presented and the 3D deep learning network may yield predicted 3D positional features 542.

An example of a reference object for use in determination of manually engineered 3D positional features, in this case a curve that approximates a dental arch, is provided in FIG. 6. In this example, a cloud of points in the axial (xy) plane indicates areas of high intensity values (bright white areas) may indicate areas of teeth or jaw structures. In order to determine a dental arch curve, the computer may determine areas in an axial plane of the image volume associated with bright voxels (e.g. voxels having an intensity value above a predetermine threshold value) which may be identified as teeth or jaw voxels. These areas of high intensity may be used to determine a crescent arrangement of bright areas that approximates the dento-maxillofacial arch. This way, a dental arch curve may be determined, which approximates an average of the dento-maxillofacial arches of the upper jaw and the lower jaw respectively. In another embodiment, separate dental arch curves associated with the upper and low jaw may be determined.

FIG. 7A-7E depict examples of 3D positional features of 3D image data according to various embodiments of the invention.

Figure 7A:
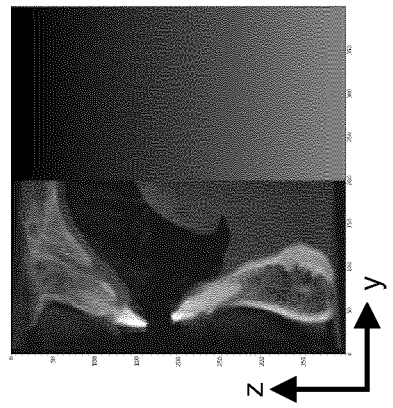

FIG. 7A depicts (left) an image of a slice of the sagittal plane of a 3D image data stack and (right) an associated visualization of a so-called height-feature of the same slice. Such height feature may encode a z-position (a height 704) of each voxel in the image volume of the 3D CT image data stack relative to a reference plane 702. The reference plane (e.g. the axial or xy plane which is determined to be (the best approximation of) the xy plane with approximately equal distance to both the upper jaw and the lower jaw and their constituent teeth.

Other 3D positional features may be defined to encode spatial information in an xy space of a 3D image data stack. In an embodiment, such positional feature may be based on a curve which approximates (part of) the dental arch. Such a positional feature is illustrated in FIG. 7B, which depicts (left) a slice from an 3D image data stack and (right) a visualization of the so-called travel-feature for the same slice. This travel-feature is based on the curve that approximates the dental arch 706 and defines the relative distance 708 measured along the curve. Here, zero distance may be defined as the point 710 on the curve where the derivative of the second degree polynomial is (approximately) zero. The travelled distance increases when moving in either direction on the x-axis, from this point (e.g. the point where the derivative is zero).

A further 3D positional feature based on the dental arch curve may define the shortest (perpendicular) distance of each voxel in the image volume to the dental arch curve 706. This positional feature may therefore be referred to as the 'distance-feature'. An example of such feature is provided in FIG. 7C, which depicts (left) a slice from the 3D image data stack and (right) a visualization of the distance-feature for the same slice. For this feature, zero distance means that the voxel is positioned on the dental arch curve 708.

Yet a further 3D positional feature may define positional information of individual teeth. An example of such feature (which may also be referred to as a dental feature) is provided in FIG. 7D, which depicts (left) a slice from the 3D image data stack and (right) a visualization of the dental feature for the same slice. The dental feature may provide information to be used for determining the likelihood to find voxels of certain teeth at a certain position in the voxel space. This feature may, following a determined reference plane such as 702, encode a separate sum of voxels over the normal to any plane (e.g. the xy plane or any other plane). This information thus provides the neural network with a 'view' of all information from the original space as summed over the plane normal. This view is larger than would be processed when excluding this feature and may provide a means of differentiating whether a hard structure is present based on all information in the chosen direction of the space (as illustrated in $712_{1,2}$ for the xy plane).

Figure 7E:
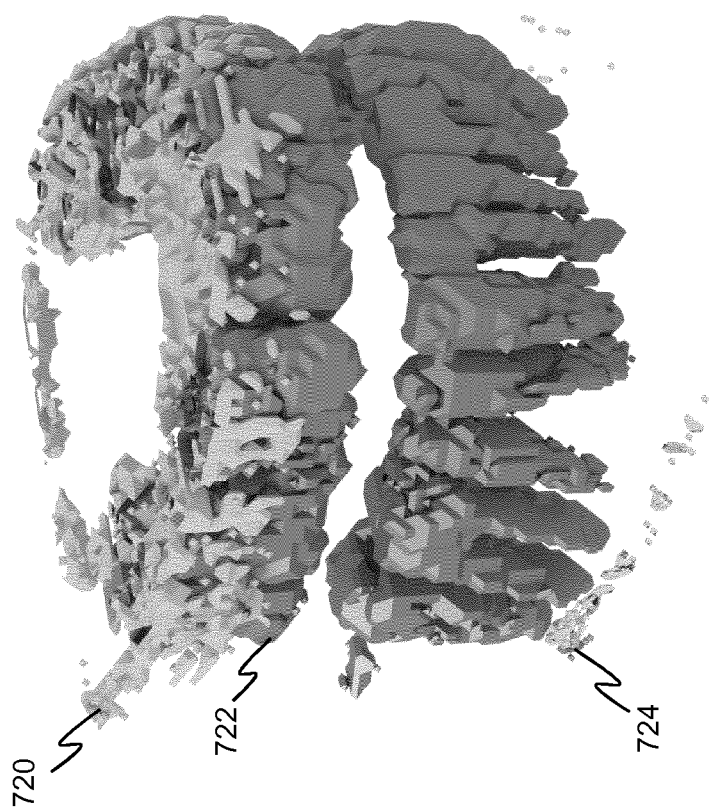

FIG. 7E shows a visualization of 3D positional features as may be generated by a machine learning pre-processor, in particular a 3D deep neural network as described with respect to FIG. 5B. These 3D positional features have been computer rendered in 3D and shown 3D volumes are the result of thresholding of predicted values. From the relative 'roughness' of the surfaces defining the volumes it can be seen that such network and it's input and target data operated on a lower 3D resolution than that of the definitive voxel representation to be segmented (In the case of this example, a resolution of 1×1×1 mm per voxel was employed). As targets, the same training data might be used as might have been employed for the segmentation 3D deep learning network, but down-sampled to an applicable resolution that adheres to processing requirements for usage by such a pre-processing 3D deep neural network. This leads to, in effect, such 3D positional features containing a 'rough' pre-segmentation of, in the case of this example, jaw 720, tooth 722 and nerve 724 structures. For the purpose of this illustration, the lower jaw of this particular patient has not been rendered so as to show the voxels classified as being most likely to be part of the nerve structure.

Such rough pre-segmentation may be appropriately up-sampled, e.g. by means of interpolation, ensuring that per voxel at the desired segmentation resolution (being the originally received voxel resolution), information from such pre-segmentation spatially coincides at the desired resolution. For example, information from one voxel in the shown visualization may spatially coincide with 5×5×5 voxels at the desired resolution, and this information should be paired with all applicable 125 voxels at the desired resolution. Afterwards this up-sampled information may be presented as, or included in, a set of 3D positional features and, as described with reference to FIG. 4, be fed into the segmentation 3D deep neural network as input.

Hence, FIG. 5-7 show that a 3D positional feature defines information about voxels of a voxel representation that are provided to the input of a deep neural network that is trained to classify voxels. The information may be aggregated from all (or a substantial part of) the information available from the voxel representation wherein during the aggregation the position of a voxel relative to a dental reference object may be taken into account. Further, the information being aggregated such that it can be processed per position of a voxel in the first voxel representation.

Figure 8C:
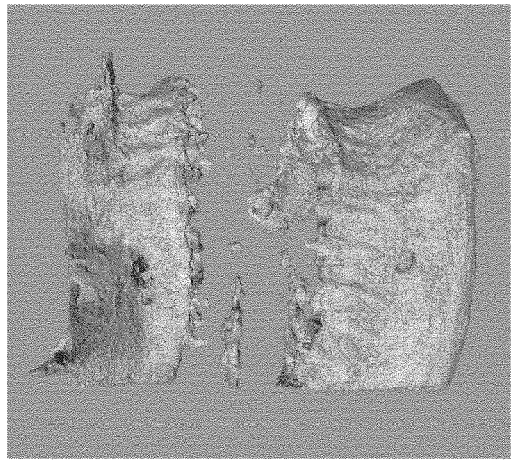
FIG. 8A-8D depict examples of the output of a trained deep learning neural network according to an embodiment of the invention.
Figure 8D:
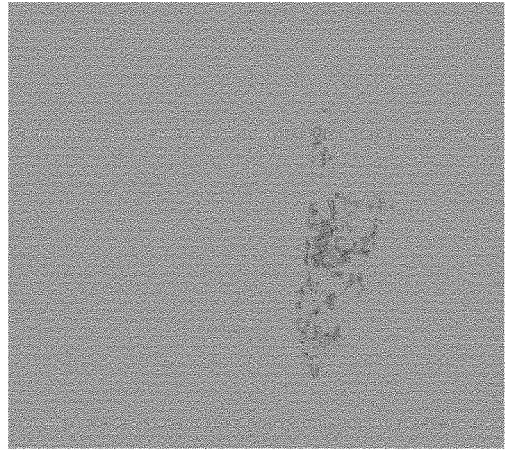
Figure 8A:
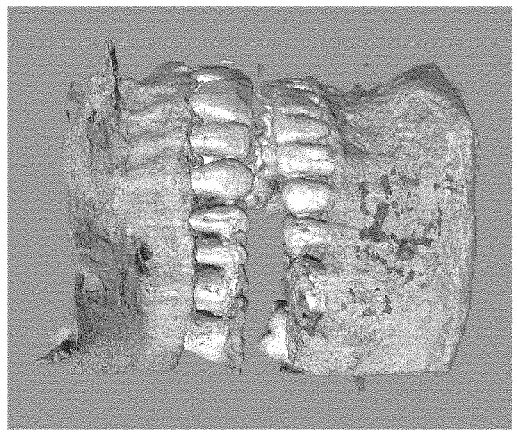
Figure 8B:
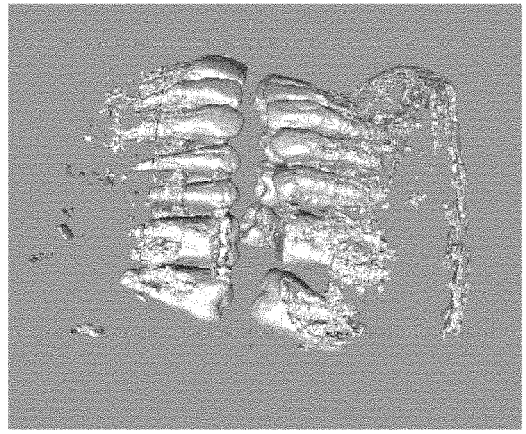

FIG. 8A-8D depict examples of the output of a trained deep learning neural network according to an embodiment of the invention. In particular, FIG. 8A-8D depict 3D images of voxels that are classified using a deep learning neural network that is trained using a training method as described with reference to FIG. 2. As shown in FIGS. 8B and 8C, voxels may be classified by the neural network in voxels belonging to teeth structures (FIG. 8B), jaw structures (FIG. 8C) or nerve structures (FIG. 8D). FIG. 8A depicts a 3D image including the voxels that the deep learning neural network has classified as teeth, jaw and nerve tissue. As shown by FIG. 8B-8D, the classification process is accurate but there are still quite a number of voxels that are missed or that are wrongly classified. For example, as shown in FIGS. 8B and 8C voxels that may be part of the jaw structure are classified as teeth voxels while in the surfaces belonging to the roots of the teeth voxels are missed. As shown in FIG. 8D, this problem is even more pronounced with classified nerve voxels.

Figure 9:
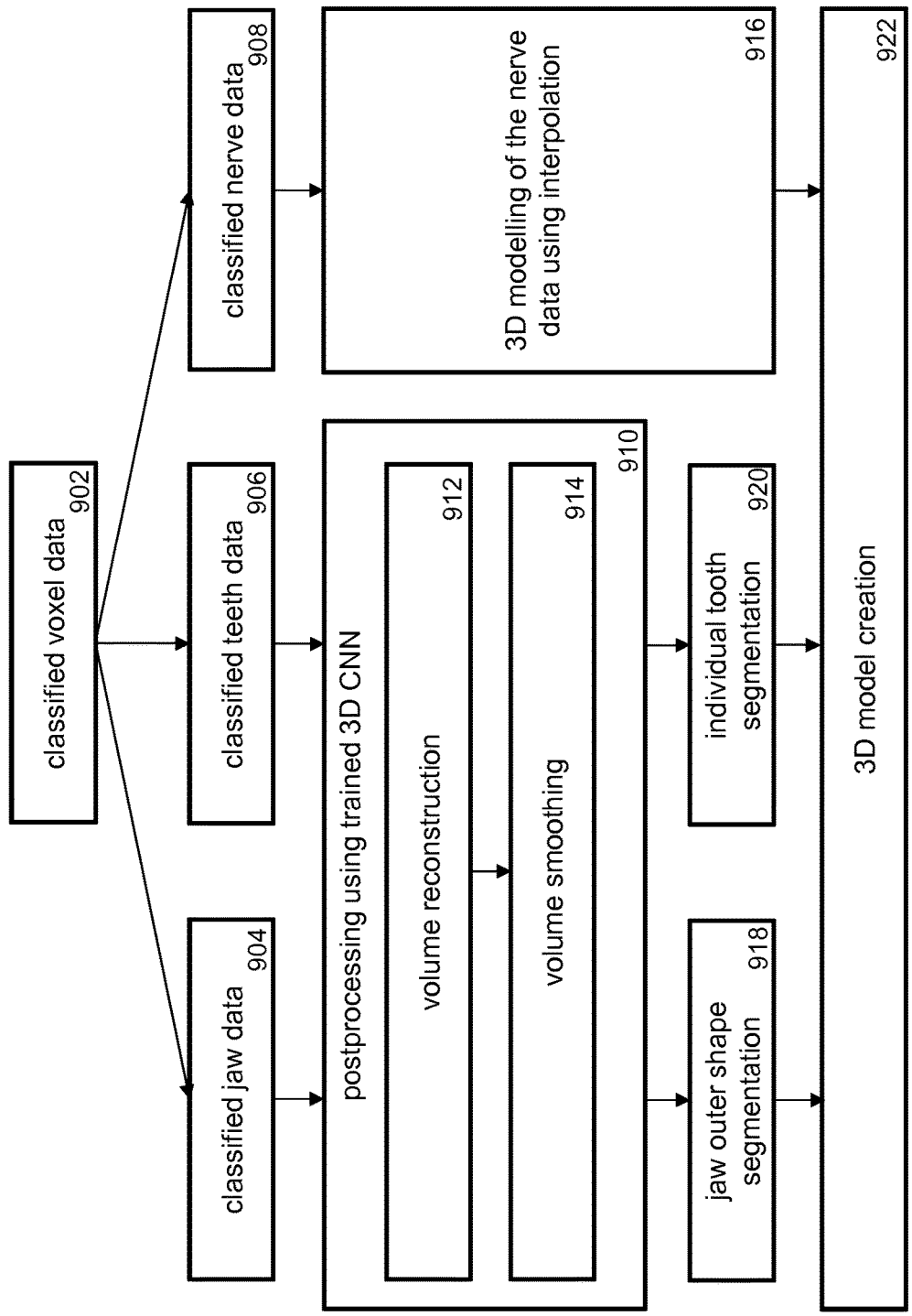
FIG. 9 depicts a flow-diagram of post-processing classified voxels of 3D dento-maxillofacial structures according to an embodiment of the invention.

In order to address the problem of outliers in the classified voxels (which form the output of the first deep learning neural network), the voxels may be post-processed. FIG. 9 depicts a flow-diagram of post-processing classified voxels of 3D dento-maxillofacial structures according to an embodiment of the invention. In particular, FIG. 9 depicts a flow diagram of post-processing voxel data of dento-maxillofacial structures that are classified using a deep learning neural network as described with reference to FIG. 1-8 of this application.

As shown in FIG. 9 the process may include a step of dividing the classified voxel data 902 of a dento-maxillofacial structure into voxels that are classified as jaw voxels 904, teeth voxels 906 and voxels that are classified as nerve data 908. As will be described hereunder in more detail, the jaw and teeth voxels will be post-processed using a further, second deep learning neural network 910. In contrast to the initial first deep learning neural network (which uses a 3D CT image data stack of a dento-maxillofacial structure and associated positional features as input), which generates the best possible voxel classification based on the image data, the second 'post processing' deep learning neural network translates parts of the output of the first deep learning neural network to voxels so that the output more closely matches the desired 3D structures.

The post-processing deep learning neural network encodes representations of both teeth and jaw. During the training of the post-processing deep learning neural network, the parameters of the neural network are tuned such that the output of the first deep learning neural network is translated to the most feasible 3D representation of these dento-maxillofacial structures. This way, imperfections in the classified voxels can be reconstructed 912. Additionally, the surface of the 3D structures can be smoothed 914 so that the best feasible 3D jaw model and teeth models can be generated. Omitting the 3D CT image data stack from being an information source for the post processing neural network makes this post processing step robust against undesired variances within the image stack.

Due to the nature of the (CB)CT images, the output of the first deep learning neural network will suffer from (before mentioned) potential artefacts such as averaging due to patient motion, beam hardening, etc. Another source of noise is variance in image data captured by different CT imagers. This variance results in various factors being introduced such as varying amounts of noise within the image stack, varying voxel intensity values representing the same (real world) density, and potentially others. The effects that the above-mentioned artefacts and noise sources have on the output of the first deep learning neural network may be removed or at least substantially reduced by the post-processing deep learning neural network, leading to segmented jaw voxels 918 and segmented teeth voxels 920.

The classified nerve data 908 may be post-processed separately from the jaw and teeth data. The nature of the nerve data, which represent long thin filament structures in the CT image data stack, makes this data less suitable for post-processing by a deep learning neural network. Instead, the classified nerve data is post-processed using an interpolation algorithm in order to procedure segmented nerve data 916. To that end, voxels that are classified as nerve voxels and that are associated with a high probability (e.g. a probability of 95% or more) are used by the fitting algorithm in order to construct a 3D model of the nerve structures. Thereafter, the 3D jaw, teeth and nerve models are combined into a 3D model of the dento-maxillofacial structure.

Figure 10:
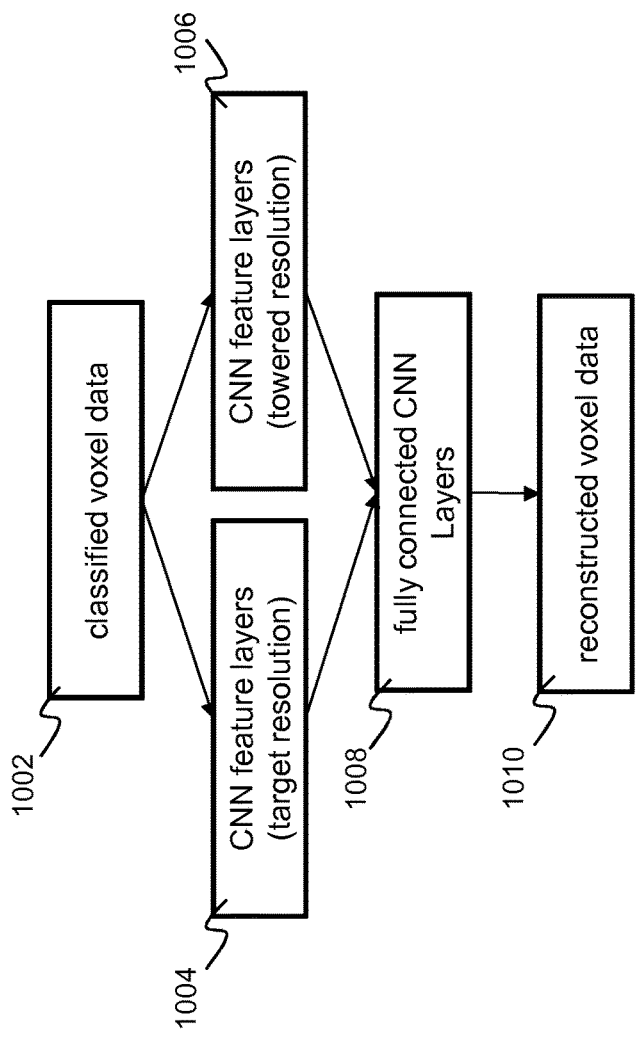
FIG. 10 depicts a deep neural network architecture for post-processing classified voxels of 3D dento-maxillofacial structures according to an embodiment of the invention.

FIG. 10 depicts an example of an architecture of a deep learning neural network that is configured for post-processing classified voxels of a 3D dento-maxillofacial structure according to an embodiment of the invention. The post-processing deep learning neural network may have an architecture that is similar to the first deep learning neural network, including a first path formed by a first set of 3D CNN feature layers 1004, which is configured to process the input data (in this case a part of classified voxel data) at the resolution of the target. The deep learning neural network further includes a second set of 3D CNN feature layers 1006, which is configured to process the context of the input data that are processed by the first 3D CNN feature layers but then at a lower resolution than the target. The output of the first and second 3D CNN feature layers are then fed to the input of a set of fully connected 3D CNN layers 1008 in order to reconstruct the classified voxel data such that they closely represent a 3D model of the 3D dento-maxillofacial structure. The output of the fully connected 3D CNN layer provides the reconstructed voxel data.

The post-processing neural network may be trained using the same targets as first deep learning neural network, which represent the same desired output. During training, the network is made as broadly applicable as possible by providing noise to the inputs to represent exceptional cases to be regularized. Inherent to the nature of the post-processing deep learning neural network, the processing it performs also results in the removal of non-feasible aspects from the received voxel data. Factors here include the smoothing and filling of desired dento-maxillofacial structures, and the outright removal of non-feasible voxel data.

Figure 11B:
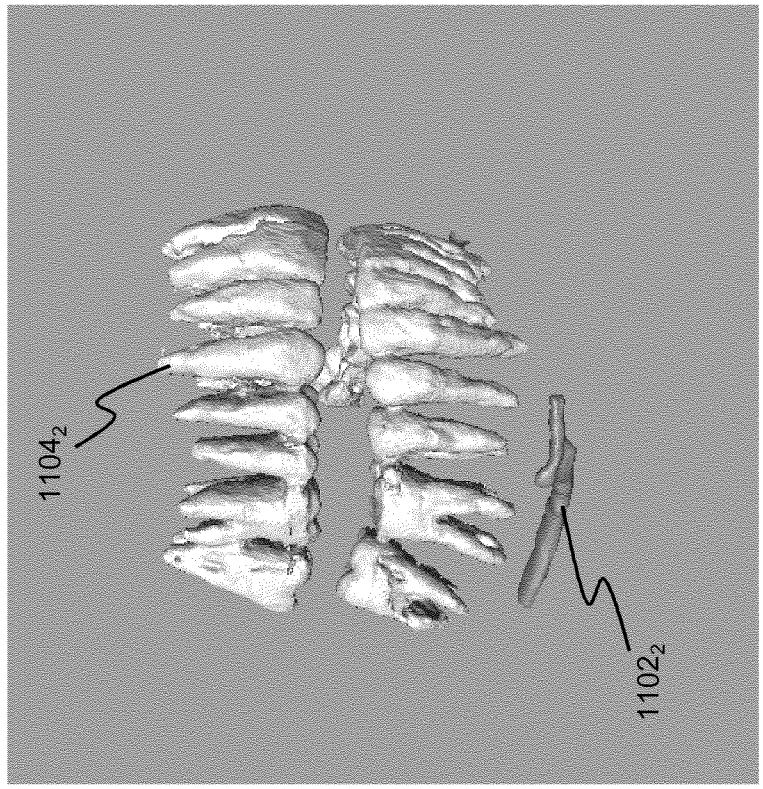
FIG. 11A-11B depict a surface reconstruction process of classified voxels according to an embodiment of the invention.
Figure 11A:
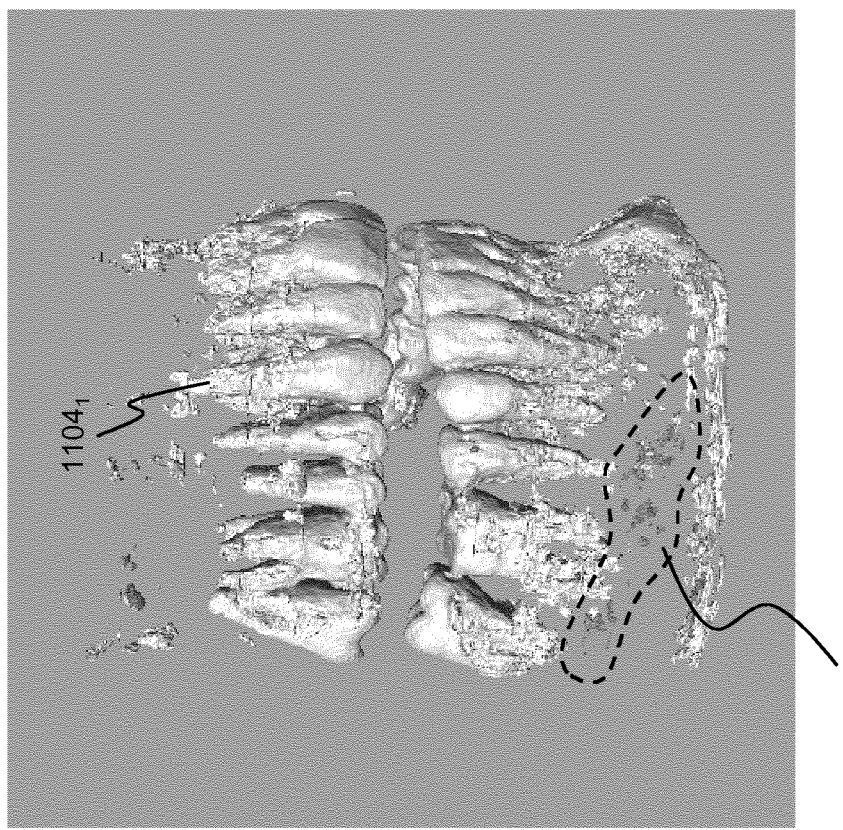

FIGS. 11A and 11B depicts an iteration of the post-processing network resulting in surface reconstruction of classified voxels according to an embodiment of the invention. In particular, FIG. 11A depicts a picture of classified voxels of teeth structures, wherein the voxels are the output of the first deep learning neural network. As shown in the figure noise and other artefacts in the input data result in irregularities and artefacts in the voxel classification and hence 3D surface structures that include gaps in sets of voxels that represent a tooth structure. These irregularities and artefacts are especially visible at the inferior alveolar nerve structure $1102_1$, and the dental root structures $1104_1$ of the teeth, i.e. the areas where the deep learning neural network has to distinguish between teeth voxels and voxels that are part of the jaw bone.

FIG. 11B depicts the result of the post-processing according the process as described with reference to FIGS. 9 and 10. As shown in this figure the post-processing deep learning neural network successfully removes artefacts that were present in the input data (the classified voxels). The post-processing step successfully reconstructs parts that were substantially affected by the irregularities and artefacts, such as the root structures $1104_1$ of the teeth which now exhibit smooth surfaces that provide an accurate 3D model of the individual tooth structures $1104_2$. High probability nerve voxels $1102_1$ (e.g. a probability of 95% or more) are used by a fitting algorithm in order to construct a 3D model of the nerve structures $1102_2$.

While the figures depict the 3D deep neural networks as separate neural networks, in which each neural networks has a certain function, e.g. a pre-processing, classifying and segmenting and post-processing, these neural networks may also be connected to each other forming one or two deep neural network that include the desired functionality. In that case, different neural networks may be separately trained (as e.g. described with references to the figures in this disclosure). Thereafter, the trained networks may be connected to each other forming one deep neural network.

Figure 12:
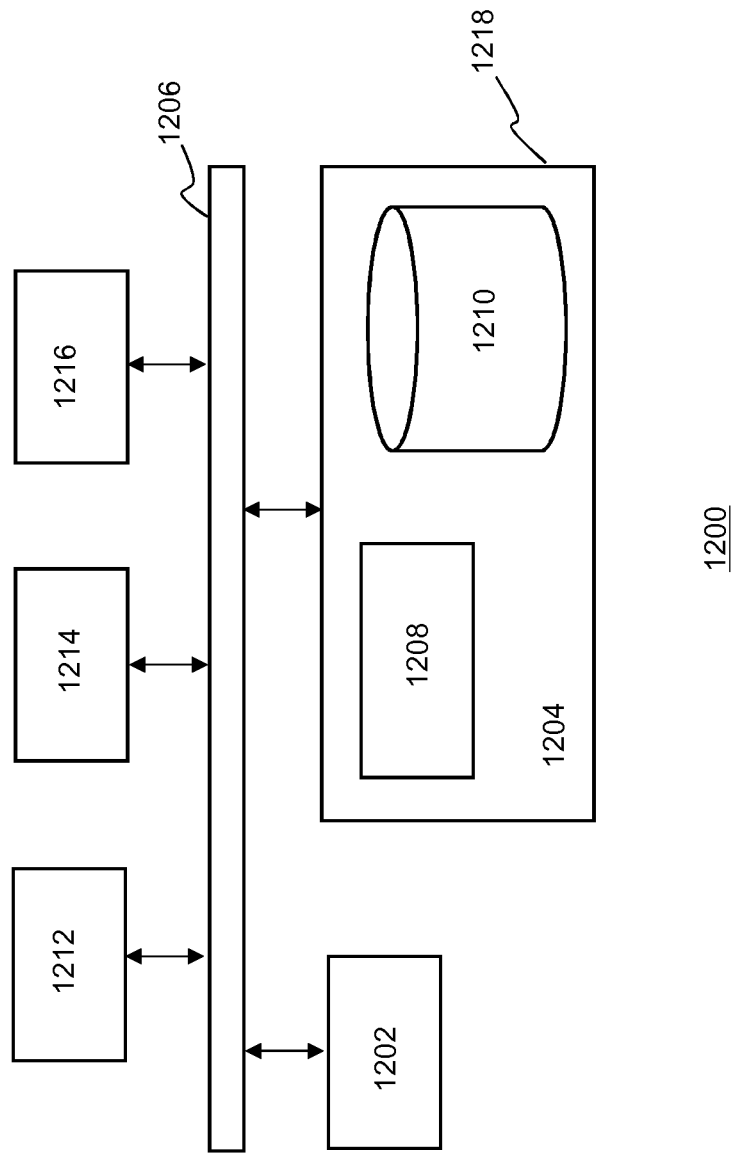
FIG. 12 is a block diagram illustrating an exemplary data computing system that may be used for executing methods and software products described in this disclosure.

FIG. 12 is a block diagram illustrating exemplary data processing systems described in this disclosure. Data processing system 1200 may include at least one processor 1202 coupled to memory elements 1204 through a system bus 1206. As such, the data processing system may store program code within memory elements 1204. Further, processor 1202 may execute the program code accessed from memory elements 1204 via system bus 1206. In one aspect, data processing system may be implemented as a computer that is suitable for storing and/or executing program code. It should be appreciated, however, that data processing system 1200 may be implemented in the form of any system including a processor and memory that is capable of performing the functions described within this specification.

Memory elements 1204 may include one or more physical memory devices such as, for example, local memory 1208 and one or more bulk storage devices 1210. Local memory may refer to random access memory or other non-persistent memory device(s) generally used during actual execution of the program code. A bulk storage device may be implemented as a hard drive or other persistent data storage device. The processing system 1200 may also include one or more cache memories (not shown) that provide temporary storage of at least some program code in order to reduce the number of times program code must be retrieved from bulk storage device 1210 during execution.

Input/output (I/O) devices depicted as input device 1212 and output device 1214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1216 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1200.

As pictured in FIG. 12, memory elements 1204 may store an application 1218. It should be appreciated that data processing system 1200 may further execute an operating system (not shown) that can facilitate execution of the application. Application, being implemented in the form of executable program code, can be executed by data processing system 1200, e.g., by processor 1202. Responsive to executing application, data processing system may be configured to perform one or more operations to be described herein in further detail.

In one aspect, for example, data processing system 1200 may represent a client data processing system. In that case, application 1218 may represent a client application that, when executed, configures data processing system 1200 to perform the various functions described herein with reference to a "client". Examples of a client can include, but are not limited to, a personal computer, a portable computer, a mobile phone, or the like.

In another aspect, data processing system may represent a server. For example, data processing system may represent an (HTTP) server in which case application 1218, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for processing 3D data representing a dento-maxillofacial structure comprising:

a computer receiving 3D input data that includes a first voxel representation of the dento-maxillofacial structure, a voxel being associated with a radiation intensity value, the voxels of the voxel representation defining an image volume;

determining one comp more 3D positional features of the dento-maxillofacial structure based on the 3D input data, a 3D positional feature defining information about positions of voxels of the first voxel representation relative to the position of a dental reference plane, or about positions of voxels of the first voxel representation relative to the postion of a dental reference object in the image volume;

providing the first voxel representation and the one or more 3D positional features associated with the first voxel representation to the input of a first 3D deep neural network, that is trained to classify voxels of the first voxel representation into at least jaw, teeth, or nerve voxels;

wherein the training is based on a training set, including 3D image data of dento-maxillofacial structures and one or more 3D positional features derived from the 3D image data of the training set;

receiving classified voxels of the first voxel representation from the output of the first 3D deep neural network and determining a voxel representation of at least one of the jaw, teeth or nerve tissue of the dento-maxillofacial structure based on the classified voxels.

2. The method according to claim 1 wherein a pre-processing algorithm determining one or more 3D positional features includes:

determining a distance between a voxel of the voxel representation and a dental reference plane or a dental reference object, in the image volume;

determining accumulated intensity values of voxels in one or more points of a reference plane of the image volume, an accumulated intensity value at a point in the reference plane including accumulated intensity values of voxels on or in the proximity of the normal running through the point in the reference plane.

3. The method according to claim 2 wherein the dental reference plane including an axial plane in the image volume positioned at predetermined distance from the upper or lower jaw of the dento-maxillofacial structure; or, wherein the dental reference object includes a dental arch curve approximating at least part of a dental arch as represented by the dento-maxillofacial structure.

4. The method according claim 1 wherein the pre-processing algorithm includes a second 3D deep neural network that is trained to receive a second voxel representation at its input, and, to determine for voxels of the second voxel representation a 3D positional feature, wherein the second voxel representation is a low-resolution version of the first voxel representation.

5. The method according to claim 1 wherein providing the first voxel representation and the one or more 3D positional features associated with the first voxel representation to the input of a first 3D deep neural network further comprises:
associating a voxel of the first voxel representation with information defined by at least one of the one or more 3D positional features;
dividing the first voxel representation in first blocks of voxels;
providing a first block of voxels to the input of the first deep neural network, wherein a voxel of the first block of voxels is associated with a radiation intensity value and the information defined by by at least one of the one or more 3D positional features.

6. The method according to claim 1 wherein the first deep neural network comprises a plurality of first 3D convolutional layers, the output of the plurality of first 3D convolutional layers being connected to at least one fully connected layer, wherein the plurality of first 3D convolutional layers are configured to process a first block of voxels from the first voxel representation and wherein the at least one fully connected layer is configured to classify voxels of the first block of voxels into at least one of jaw, teeth or nerve voxels.

7. The method according to claim 6 wherein first deep neural network further comprises a plurality of second 3D convolutional layers, the output of the plurality of second 3D convolutional layers being connected to the at least one fully connected layer, wherein the plurality of second 3D convolutional layers are configured to process a second block of voxels from the first voxel representation, the first and second block of voxels having the same or substantially the same center point in the image volume and the second block of voxels representing a volume in real-world dimensions that is larger than the volume in real-world dimensions of the first block of voxels, the plurality of second 3D convolutional layers being configured to determine contextual information associated with voxels of the first block of voxels that is provided to the input of the plurality of first 3D convolutional layers.

8. The method according to claim 6 wherein first deep neural network further comprises a plurality of third 3D convolutional layers, the output of the plurality of third 3D convolutional layers being connected to the at least one fully connected layer, wherein the plurality of third 3D convolutional layers are configured to process one or more 3D positional features associated with voxels of at least the first block of voxels that is provided to the input of the plurality of first 3D convolutional layers.

9. The method according to claim 1, further comprising:
post-processing the voxels classified by the first deep neural network with a third deep neural network, the third deep neural network being trained to receive voxels that are classified by the first deep neural network at its input and to correct voxels that are incorrectly classified by the first deep neural network.

10. A computer-implemented method for training a 3D deep neural network system to process 3D image data of a dento-maxillofacial structure comprising:
a computer receiving training data, the training data including 3D input data defining one or more voxel representations of one or more dento-maxillofacial structures respectively, a voxel being associated with a radiation intensity value, the voxels of a voxel representation defining an image volume;
processing the one or more voxel representations of the one or more dento-maxillofacial structures respectively to determine one or more 3D positional features for voxels in the one or more voxel representations, a 3D positional feature defining information about a position of at least one voxel of a voxel representation of a dento-maxillofacial structures relative to the position of a dental reference plane or the position of a dental reference object in the image volume; and,
training the 3D deep neural network to classify voxels into jaw, teeth, or nerve voxels based on the training data and the one or more 3D positional features.

11. The method according to claim 10, further comprising:
using voxels that are classified during the training of the first deep neural network and the one or more 3D models of parts of the dento-maxillofacial structures of the 3D image data of the training set to train a third neural network to post-process voxels classified by the first deep neural network, wherein the post-processing by the third neural network includes correcting voxels that are incorrectly classified by the first deep neural network.

12. A computer system configured to process 3D image data of a dento-maxillofacial structure comprising:
a computer readable storage medium having computer readable program code embodied therewith, the computer readable program code including a pre-processing algorithm and a first first deep neural network; and
a processor coupled to the computer readable storage medium, wherein responsive to executing the computer readable program code, the processor is configured to perform executable operations comprising:
receiving 3D input data including a first voxel representation of the dento-maxillofacial structure, a voxel being associated with a radiation intensity value, the voxels of the voxel representation defining an image volume;
determining one or more 3D positional features of the dento-maxillofacial structure based on the 3D input data, a 3D positional feature defining information about positions of voxels of the first voxel representation relative to the position of a dental reference plane, or relative to the position of a dental reference object;
providing the first voxel representation and the one or more 3D positional features associated with the first voxel representation to the input of a first 3D deep neural network, the first deep neural network being configured to classify voxels of the first voxel representation into at least jaw, teeth, or nerve voxels, the first neural network being trained on the basis of a training set, the training set including 3D image data of dento-maxillofacial structures and, one or more 3D positional features derived from the 3D image data of the training set;

receiving classified voxels of the first voxel representation from the output of the first 3D deep neural network and determining a voxel representation of at least one of the jaw, teeth or nerve tissue of the dento-maxillofacial structure on the basis of the classified voxels.

13. The computer system according to claim 12 wherein the pre-processing algorithm includes a second 3D deep neural network, that is trained to receive a second voxel representation at its input, and, to determine for voxels of the second voxel representation a 3D positional feature, wherein the second voxel representation is a low-resolution version of the first voxel representation.

14. The computer system according to claim 13 the first deep neural network comprising:

a plurality of first 3D convolutional layers, the output of the plurality of first 3D convolutional layers being connected to at least one fully connected layer, wherein the plurality of first 3D convolutional layers are configured to process a first block of voxels from the first voxel representation and wherein the at least one fully connected layer is configured to classify voxels of the first block of voxels into at least one of jaw, teeth or nerve voxels.

15. The computer system according to claim 14 wherein the first deep neural network further comprises:

a plurality of second 3D convolutional layers, an output of the plurality of second 3D convolutional layers being connected to the at least one fully connected layer, wherein the plurality of second 3D convolutional layers are configured to process a second block of voxels from the first voxel representation, the first and second block of voxels having the same or substantially the same center point in the image volume and the second block of voxels representing a volume in real-world dimensions that is larger than the volume in real-world dimensions of the first block of voxels, the plurality of second 3D convolutional layers being configured to determine contextual information associated with voxels of the first block of voxels that is provided to the input of the plurality of first 3D convolutional layers.

* * * * *